United States Patent
Ito et al.

(10) Patent No.: US 6,693,960 B2
(45) Date of Patent: *Feb. 17, 2004

(54) MOVING PICTURE ENCODER AND MOVING PICTURE DECODER

(75) Inventors: Norio Ito, Chiba (JP); Hiroyuki Katata, Chiba (JP); Tomoko Aono, Chiba (JP); Hiroshi Kusao, Chiba (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,452
(22) PCT Filed: May 16, 1997
(86) PCT No.: PCT/JP97/01659
§ 371 (c)(1), (2), (4) Date: Feb. 17, 1999
(87) PCT Pub. No.: WO98/08343
PCT Pub. Date: Feb. 26, 1998

(65) Prior Publication Data
US 2003/0016746 A1 Jan. 23, 2003

(30) Foreign Application Priority Data

Aug. 21, 1996 (JP) .............................. 8-219513
Mar. 25, 1997 (JP) ............................. 9-072095

(51) Int. Cl.[7] ............................................... H04N 7/12
(52) U.S. Cl. ............................... 375/240.11; 375/240.1; 375/240.16
(58) Field of Search ......................... 375/240.1, 240.16, 375/240, 240.11; 348/422, 405, 413, 415

(56) References Cited

U.S. PATENT DOCUMENTS 5,418,570 A * 5/1995 Ueno et al. ................. 348/413
5,742,343 A * 4/1998 Haskell et al. .............. 348/415

(List continued on next page.)

FOREIGN PATENT DOCUMENTS

JP 60206287 10/1985
JP 4178074 6/1992

(List continued on next page.)

OTHER PUBLICATIONS

Papers from 1996 Annual Meeting of IEICE information system 2, Mar. 1996 (Tokyo) p. 13.

(List continued on next page.)

*Primary Examiner*—Vu Le
*Assistant Examiner*—Behrooz Senfi
(74) *Attorney, Agent, or Firm*—Birch, Stewart, Kolasch & Birch, LLP

(57) ABSTRACT

When a background interpolation-judging section 107 judges that parts areas of a lower layer and an upper layer move significantly, and a visual effect can be obtained by the background interpolation, a controller 103 controls a switch 104 based on the area information of the parts area of the lower layer to perform the background interpolation. A weighted average section 106 takes an average by weighting to the upper layer and the lower layer by using the interpolated background to generate an interpolated image. By using this interpolated image, the prediction-encoding/decoding of the upper layer is performed. On the contrary, when the background interpolation-judging section 107 judges that parts areas do not move so significantly, and a visual effect cannot be obtained by the background interpolation, a background is synthesized by using the output of the interpolated image-forming section 105 to generate an interpolated image. Hence, the shape information for the background interpolation is reduced and high quality of an image can be obtained.

12 Claims, 14 Drawing Sheets

U.S. PATENT DOCUMENTS

| | | | | |
|---|---|---|---|---|
| 5,963,257 A | * | 10/1999 | Katata et al. | 375/240.11 |
| 6,052,414 A | * | 4/2000 | Lee et al. | 375/240 |
| 6,148,030 A | * | 11/2000 | Katata et al. | 375/240.1 |
| 6,192,081 B1 | * | 2/2001 | Chiang et al. | 375/240.16 |
| 6,222,882 B1 | * | 4/2001 | Lee et al. | 375/240.16 |

FOREIGN PATENT DOCUMENTS

| | | |
|---|---|---|
| JP | 6501358 | 2/1994 |
| JP | 738899 | 2/1995 |
| JP | 8116542 | 5/1996 |
| JP | 8129646 | 5/1996 |
| JP | 8331565 | 12/1996 |
| JP | 9307906 | 11/1997 |

OTHER PUBLICATIONS

Papers from 1996 Annual Meeting of IEICE information system 2, Mar. 1996 (Tokyo) p. 339.

Report of Information Processing Soc. of Japan 95–AVM 9, vol. 95, No. 64, Jul. 1995 (Tokyo) p. 1–8.

IEEE Transaction on Circuits and Systems for Video Technology, vol. 7, No. 1, Feb. 1997, p. 52–59.

Katata, H., Kusao, H.: "Temporal Scalability Based on Image Content," International Organization for Standardization—Organisation Internationale De Normalisation ISO/IEC JTC1/SC29/WG11/MPEG95/211, Jul. 1995, pp. 1–2.

The Institute of Electronics, Information and Communication Engineers, "An Image Coding Scheme Using Layered Representation and Multiple Templates"; Technical Report of IEICE IE94–159, 1995; pp. 99–106.

Hiroyuki Katata et al.; "Coding of Moving Pictures and Associated Audio Information"; ISO/IEC/JTC1/SC29/WG11 MPEG95/9377; Nov. 1995; pp. 1–27.

* cited by examiner

FIG. 13
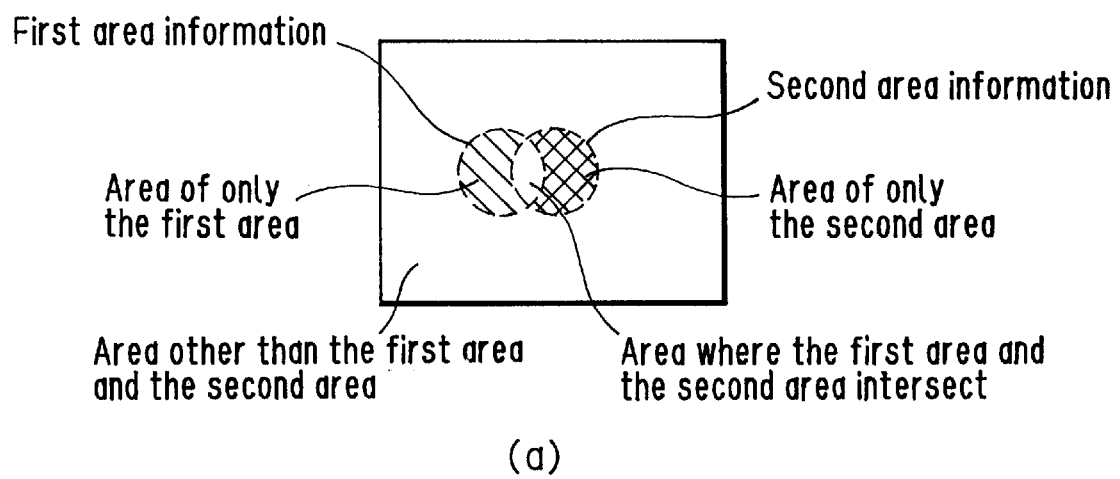
First area information
Second area information
Area of only the first area
Area of only the second area
Area other than the first area and the second area
Area where the first area and the second area intersect
(a)
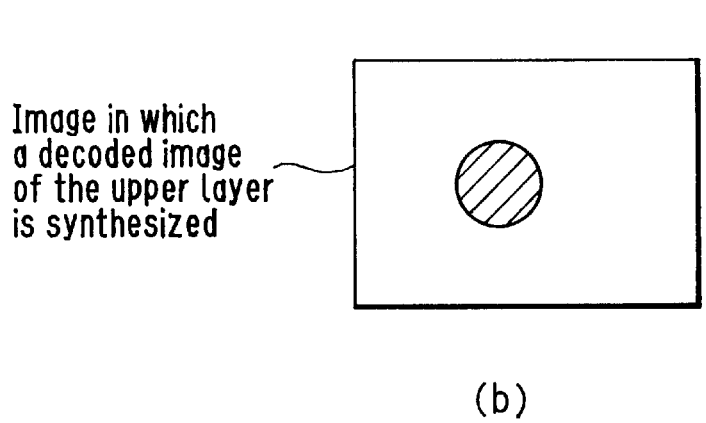
Image in which a decoded image of the upper layer is synthesized
(b)

FIG. 14
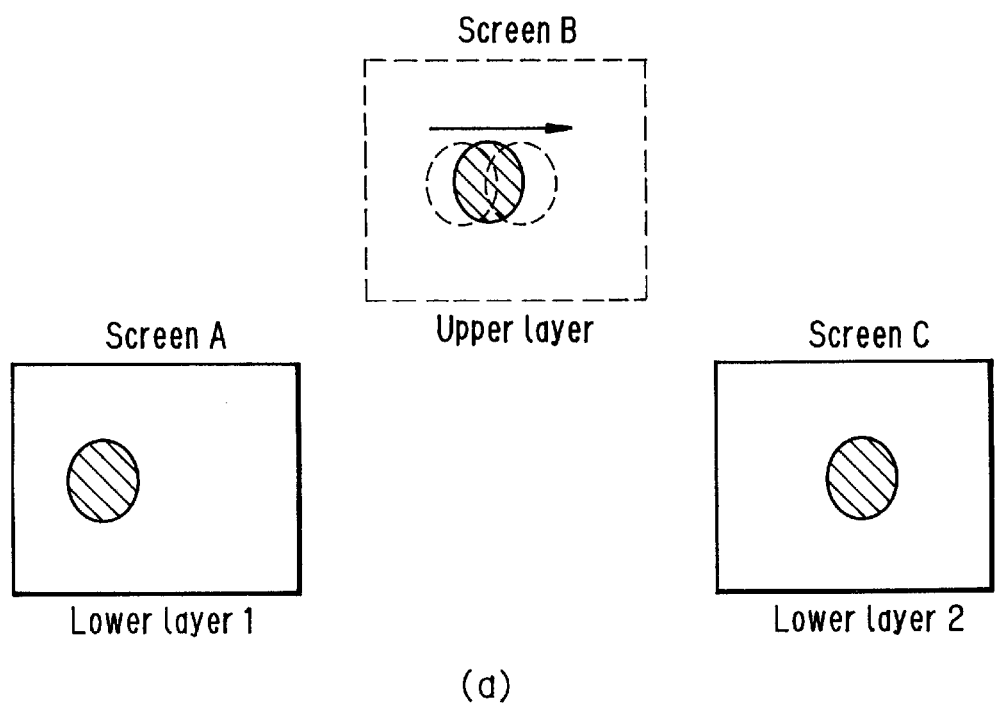
(a)
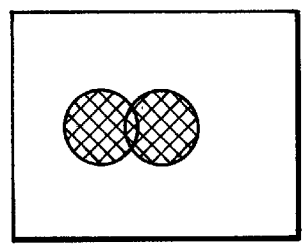
(b)
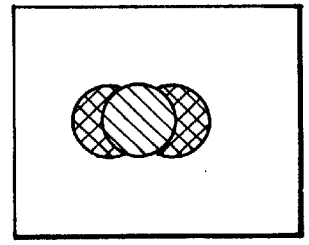
(c)

( ⬢ : Selected area    ↑ : Copy    ⋀ : Inter-polation    ⤺ : Prediction of a moment compensation )

Parts area of the upper layer

First parts area of the lower layer

MOVING PICTURE ENCODER AND MOVING PICTURE DECODER

This application is the national phase under 35 U.S.C. §371 of prior PCT International Application No. PCT/JP97/01659 which has an International filing date of May 16, 1997 which designated the United States of America.

TECHNICAL FIELD

The present invention relates to technical field of a digital image processing and especially relates to a moving image encoding apparatus for efficiently encoding image data, and a moving image decoding apparatus for decoding the encoded data produced by the moving image encoding apparatus.

BACKGROUND ART

In the image encoding, a method of synthesizing different moving image sequences has been studied.

In a literature, "Image Encoding Using a Hierarchical Expression and Multiple Templates" (Shingaku Giho IE94-159, pp. 99–106 (1995)), there is described a method in which a moving image sequence as a background and a moving image sequence of a partial moving image as a foreground (for example, human image, picture of fish and the like cut down by a Chroma key technique) are superimposed to prepare a new sequence.

In addition, in a literature, "Temporal Scalability based on Image Content", (ISO/IEC/JTC1/SC29/WG11 MPEG95/211 (1995)), there is described a method in which a moving image sequence of a partial moving image having a high frame rate is superimposed on a moving image sequence having a low frame rate to prepare a new sequence.

With this method, as shown in FIG. 15, prediction-encoding is performed at a low frame rate in a lower layer, and prediction-encoding is performed at a high frame rate only for a selected area (dotted portion) in an upper layer. In this case, an image frame decoded up to the upper layer is obtained by superimposing an image frame decoded by the lower layer and an area decoded by the upper layer. Moreover, a frame encoded by the lower layer is not encoded in the upper layer, and the decoded image of the lower layer is directly copied. In addition, it is assumed that a portion which attracts the audience's attention, such as a personality portion is selected as the selected area.

FIG. 11 shows a block diagram of the conventional art. On the encoding side in the conventional art, the input moving image layer is thinned out between frames by a first thinning-out section 1101 and a second thinning-out section 1102, and made to be the frame rate or less of the input image, then input to an upper layer encoding section and a lower layer encoding section. Here, the frame rate in the upper layer is assumed to be higher than the frame rate of the lower layer.

In the lower layer encoding section 1104, the entire input moving image is encoded. As the encoding method, an international standard method for encoding moving images, for example, MPEG or H. 261 is used. In the lower layer encoding section 1104, decoded image of the lower layer is prepared, and input to a superimposing section 1105 upon being utilized for prediction-encoding.

In the upper layer encoding section 1103, only a selected area of the input moving image is encoded. Here, the international standard method for encoding moving images such as MPEG and H.261 is again used, but only the selected area is encoded based on the area information. However, the frame encoded in the lower layer is not encoded in the upper layer. The area information is the information showing the selected area of, for example, a personality portion, and is a binarized image which takes value 1 at a position in the selected area and takes value 0 at a position other than the selected area. Also in the upper layer encoding section 1103, only the selected area of the moving image is decoded, and input to the superimposing section 1105.

In an area information encoding section 1106, the area information is encoded by utilizing a chain code or the like.

The superimposing section 1105 outputs a decoded image of the lower layer, when the lower layer frame has been encoded in the frame to be superimposed. When the lower layer frame has not been encoded in the frame to be superimposed, the superimposing section 1105 outputs a moving image by using two decoded image of the lower layer before and behind the frame to be superimposed and one decoded image of the upper layer. The two image frames of the lower layer are before and behind the upper layer frame. The moving image prepared here is input to the lower layer encoding section 1103 and utilized for the prediction-encoding. The image forming method in the superimposing section 1105 is as described below.

First, two interpolated images of the lower layer are prepared. If it is assumed that the decoded image of the lower layer at time "t" is B(x, y, t)(provided that x and y are coordinates representing a position of a pixel in the space), and that the time of the two frames of the lower layer are t1 and t2, respectively, and the time of the upper layer is t3 (provided that t1<t3<t2), the interpolated image at time t3 (x, y, t3) can be calculated by the following expression (1):

$$I(x, y, t3)=[(t2-t3)B(x, y, t1)+(t3-t1)B(x, y, t2)]/(t2-t1) \quad (1)$$

Then, a decoded image E of the upper layer is superimposed on the interpolated image I determined by the above expression (1). For this purpose, weight information W (x, y, t) for interpolation is prepared from the area information M (x, y, t), to obtain a superimposed image S by the following expression (2):

$$S(x, y, t)=[1-W(x, y, t)]I(x, y, t)+E(x, y, t)W(x, y, t) \quad (2)$$

Here, the area information M (x, y, t) is a binarized image which takes 1 within the selected area and takes 0 outside the selected area, and by applying a low-pass filter to this image for plural times, the weight information W (x, y, t) can be obtained. That is to say, the weight information W (x, y, t) takes 1 within the selected area, takes 0 outside the selected area, and takes 0 to 1 in the boundary of the selected area. The above-mentioned description is for the image forming method in the superimposing section 1105. The encoded data encoded in the lower layer encoding section, the upper layer encoding section, and the area information encoding section is integrated in an encoded data-integrating section (not shown) and transmitted or accumulated.

Then, on the decoding side in the conventional art, the encoded data is disintegrated into an encoded data of the lower layer, an encoded data of the upper layer and an encoded data of the area information by an encoded data-disintegrating section (not shown). These encoded data is decoded by a lower layer decoding section 1108, an upper layer decoding section 1107 and an area information decoding section 1109, as shown in FIG. 11.

A superimposing section 1110 on the decoding side comprises the same apparatus as that of the superimposing section 1105 on the encoding side, and an image is superimposed in the same method as described in the description on the encoding side, using a lower-layer decoded image and an upper-layer decoded image. The moving image superimposed here displayed on a display, as well as being input to the upper layer decoding section 1107, and utilized for the prediction of the upper layer. Though a decoding apparatus for decoding both the lower layer and the upper layer has been described here, if it is a decoding apparatus having only a decoding section of the lower layer, the upper layer encoding section 1107 and the superimposing section 1110 are not required, hence a part of the encoded data can be reproduced with a small hardware scale.

At this time, since the frame rates of the lower layer and the upper layer are different, it is necessary to synthesize the lower layer corresponding to the upper layer from the lower layer frames temporally before and after of the lower layer frame. However, when an output image is obtained from two lower-layer decoded images and one upper-layer decoded image, the output image is synthesized by the interpolation of two lower layer frames, therefore when the position of the selected area changes with time, a big distortion is caused in the periphery of the selected area, resulting in a big deterioration of the image quality.

This problem can be solved by using a method such as the one described in a literature "Temporal Scalability algorithm based on image content", ISO/IEC/JTC1/SC29/WG11 MPEG96/0277 (1996). FIG. 14 illustrates a method for solving this problem, shown in the above-mentioned literature. In FIG. 14a, images A and C are two encoded images of the lower layer and an image B is an encoded image of the upper layer, the temporal order of display is an order of A, B and C. The selected area is shown by hatching.

Moreover, since only the selected area is encoded in the upper layer, outside of the selected area is shown by broken line. Since the selected area moves in the direction of an arrow in the figure, the interpolated image obtained by the image A and the image C becomes the one in which two selected areas are superposed, as shown in meshed portion in FIG. 14b. Furthermore, when the image B is superimposed by using the expression (2), the output image becomes an image in which three selected areas are superposed, as shown in FIG. 14c.

Particularly in the periphery (outside) of the selected area of the upper layer, the selected area of the lower layer appears like an afterimage to deteriorate the image quality widely. As for the entire moving image, when only the lower layer is displayed, the above-mentioned distortion does not appear, and when the superimposed image of the upper layer and the lower layer is displayed, the above-mentioned distortion appears, hence distortion like flicker appears, resulting in a big deterioration in the image quality. However, since the meshed portion on the left side of FIG. 14c can be obtained from the image C, and the meshed portion on the right side of FIG. 14c can be obtained from the image A, the above-mentioned distortion can be dissolved by using the lower layer synthesized as described above.

FIG. 12 shows a block diagram of a conventional image superimposing apparatus shown in the above-mentioned literature. A first area-extracting section 1201 in FIG. 12 extracts an area which is the first area and is not the second area, from the first area information of the lower layer and the second area information of the lower layer. In FIG. 13a, if it is assumed that the first area information is expressed by a dotted line (it is assumed that the inside of the dotted line has a value 0 and the outside of the dotted like has a value 1), and the second area information is similarly expressed by a broken like, the area extracted by the first area-extracting section 1201 becomes the hatched portion of FIG. 13a.

The second area-extracting section 1202 in FIG. 12 extracts an area which is the second area and is not the first area, from the first area information of the lower layer and the second area information of the lower layer. In the case of FIG. 13a, the meshed portion is extracted.

A controller 1203 in FIG. 12 is a section for controlling a switch 1204 with an output of the first area-extracting section 1201 and the second area-extracting section 1202. That is to say, when the position of a target pixel is only in the first area, the switch 1204 is connected to the second decoded image side, and when the position of the target pixel is only in the second area, the switch 1204 is connected to the first decoded image side, and when the position of the target pixel is in other areas, the switch 1204 is connected to the output from the interpolated image-forming section 1205.

The interpolated image-forming section 1205 in FIG. 12 calculates the interpolated image of the first decoded image of the lower layer and the second decoded image of the lower layer, according to the expression (1). Provided that in the expression (1), B (x, y, t1) is the first decoded image, B (x, y, t2) is the second decoded image, I (x, y, t3) is the interpolated image, wherein t1, t2 and t3 are the time of the first decoded image, of the second decoded image and of the interpolated image, respectively.

An image is formed as described above, therefore, in the case of FIG. 13a, for example, since the second decoded image is used in the hatched portion, a background pixel outside of the selected area appears, and in the meshed portion, since the first decoded image is used, a background pixel outside of the selected area appears, and in other portions, the interpolated image of the first decoded image and the second decoded image appears.

A decoded image of the upper layer is superimposed on the thus formed image by a weighted average section 1206 in FIG. 12, hence the superimposed image does not have an afterimage in the selected area (meshed portion) as shown in FIG. 13b, and an image having little distortion can be obtained. The weighted average section 1206 in FIG. 12 superimposes the above-mentioned synthesized image and the decoded image of the upper layer by a weighted average.

However, with the conventional apparatus, there are problems as described below.

First, when the degree of shape change due to the movement of the parts area is small, large improvement in the image quality cannot be expected with the conventional art, and since it is required to encode two shape information before and behind of the parts shape of the upper layer, the amount of codes which can be used for the texture information encoding decreases relatively, hence there is such a problem that the image quality deteriorates (the first problem).

Secondly, the conventional art has an effect when the parts area moves in one direction, but when the parts image makes reciprocating movement, the background information of the parts cannot be obtained in principle, hence there is such a problem that the image quality is not improved (the second problem).

FIG. 8 and FIG. 10 are diagrams for explaining this problem. For example, the background image of the area where the parts image areas in images A and C of FIG. 10 overlap (hatched area in FIG. 8) cannot be obtained from the image A and the image C.

Furthermore, with the conventional art, lower layer frames temporally before and after with respect to the image of the upper layer are required, but there may be a case in which one lower layer frame does not exist at the beginning or at the end of the image sequence, or before and after the scene change. Therefore, there is such a problem that the image quality is not improved in the vicinity of the parts image (the third problem).

Furthermore, the conventional art requires to change over the interpolation processing selectively for each four area, thus there is such a problem that the processing becomes complicated (the fourth problem).

It is an object of the present invention to solve these problems and to provide a moving image encoding apparatus and a moving image decoding apparatus which do not deteriorate the quality of the decoded image, while reducing data quantity after encoding without deteriorating the quality of the decoded image.

DISCLOSURE OF THE INVENTION

In view of the above situation, it is an object of the present invention to provide a moving image encoding apparatus and a moving image decoding apparatus which can reduce data quantity after encoding without deteriorating the quality of the decoded image.

With a view to solving the above problems, the gist of the present invention is as follows.

The first gist of the present invention is a moving image encoding apparatus which separates one moving image sequence to a lower layer having a low frame rate and an upper layer having a high frame rate, encodes a shape of a parts area for synthesizing the lower layer, on the condition that there is no frame corresponding to the upper layer, and encodes the upper layer by prediction, wherein when the parts area of the lower layer appearing as a background is larger than a predetermined threshold, the moving image encoding apparatus encodes the shape of the parts area, and synthesizes a frame obtained by taking the average by weighting the lower layer and a frame of the lower layer to generate image information, and when the parts area of the lower layer appearing as a background is smaller than the predetermined threshold, the moving image encoding apparatus does not encode the shape of the parts area and generates image information by the weighted average of the lower layer.

The second gist of the present invention is a moving image decoding apparatus which synthesizes a lower layer having a low frame rate on the condition that there is no frame corresponding to an upper layer having a high frame rate, decodes the upper layer by prediction, and superimposes the prediction-decoded upper layer on the lower layer to decode them into one moving image sequence, wherein when the shape of parts area has been encoded, the moving image decoding apparatus decodes the shape of the parts area, and synthesizes a frame obtained by taking the average by weighting the lower layer and a frame of the lower layer to generate image information, and when the shape of parts area has not been encoded, the moving image decoding apparatus generates image information by the weighted average of the lower layer.

The third gist of the present invention is a moving image encoding apparatus which separates one moving image sequence to a lower layer having a low frame rate and an upper layer having a high frame rate, encodes a shape of a parts area for synthesizing the lower layer on the condition that there is no frame of the lower layer corresponding to the upper layer, and encodes the upper layer by prediction, wherein the moving image encoding apparatus interpolates a pixel value within the overlapping area of the lower layer, using a pixel value in the periphery of the area appearing as a background, to generate image information.

The 4th gist of the present invention is a moving image decoding apparatus which synthesizes a lower layer having a low frame rate on the condition that there is no lower layer frame corresponding to an upper layer having a high frame rate, decodes the upper layer by prediction, and superimposes the prediction-decoded upper layer on the lower layer to decode them into one moving image sequence, wherein the moving image decoding apparatus interpolates a pixel value within the overlapping area, using a pixel value in the periphery of the overlapping area of the parts area of the lower layer appearing as a background, to generate image information.

The 5th gist of the present invention is a moving image encoding apparatus according to the first gist, wherein the pixel value within the parts area is interpolated by using a pixel value in the periphery of the parts area of the lower layer, and image information is generated by using the interpolated lower layer frame.

The 6th gist of the present invention is a moving image decoding apparatus according to the second gist, wherein the pixel value within the parts area is interpolated by using a pixel value in the periphery of the parts area of the lower layer, and image information is generated by using the interpolated lower layer frame.

The 7th gist of the present invention is a moving image encoding apparatus according to the first gist, wherein in the case where the number of frames of the lower layer required for the synthesis of the lower layer is not satisfied, the image information is generated by using a frame obtained by interpolating the parts area of the lower layer.

The 8th gist of the present invention is a moving image decoding apparatus according to the second gist, wherein in the case where the number of frames of the lower layer required for the synthesis of the lower layer is not satisfied, the image information is generated by using a frame obtained by interpolating the parts area of the lower layer.

The 9th gist of the present invention is a moving image encoding apparatus according to the first gist, wherein in the case where there are a plurality of frames of the upper layer between two adjacent frames of the lower layer, when the parts area of the lower layer appearing as a background of any one of the plurality of frames of the upper layer is larger than the predetermined threshold, the shape of the parts area for synthesizing the lower layer frame is encoded with respect to the plurality of the upper layer frames.

The 10th gist of the present invention is a moving image encoding apparatus according to the third gist, wherein in the case where there are a plurality of frames of the upper layer between two adjacent frames of the lower layer, when the parts area of the lower layer appearing as a background of any one of the plurality of frames of the upper layer is larger than the predetermined threshold, the shape of the parts area for synthesizing the lower layer frame is encoded with respect to the plurality of the upper layer frames.

The 11th gist of the present invention is a moving image encoding apparatus according to the 5th gist, wherein in the case where there are a plurality of frames of the upper layer between two adjacent frames of the lower layer, when the parts area of the lower layer appearing as a background of any one of the plurality of frames of the upper layer is larger than the predetermined threshold, the shape of the parts area for synthesizing the lower layer frame is encoded with respect to the plurality of the upper layer frames.

The 12th gist of the present invention is a moving image encoding apparatus according to the 7th gist, wherein in the case where there are a plurality of frames of the upper layer between two adjacent frames of the lower layer, when the parts area of the lower layer appearing as a background of any one of the plurality of frames of the upper layer is larger than the predetermined threshold, the shape of the parts area for synthesizing the lower layer frame is encoded with respect to the plurality of the upper layer frames.

The 13th gist of the present invention is a moving image decoding apparatus according to the second gist, wherein in the case where there are a plurality of frames of the upper layer between two adjacent frames of the lower layer, when the shape of the parts area for synthesizing the frames of the lower layer is encoded with respect to any one of the plurality of frames of the upper layer, a frame obtained by taking the average by weighting the lower layer and a frame of the lower layer are synthesized with respect to all of the plurality of frames of the upper layer to generate image information.

The 14th gist of the present invention is a moving image decoding apparatus according to the 4th gist, wherein in the case where there are a plurality of frames of the upper layer between two adjacent frames of the lower layer, when the shape of the parts area for synthesizing the frames of the lower layer is encoded with respect to any one of the plurality of frames of the upper layer, a frame obtained by taking the average by weighting the lower layer and a frame of the lower layer are synthesized with respect to all of the plurality of frames of the upper layer to generate image information.

The 15th gist of the present invention is a moving image decoding apparatus according to the 6th gist, wherein in the case where there are a plurality of frames of the upper layer between two adjacent frames of the lower layer, when the shape of the parts area for synthesizing the frames of the lower layer is encoded with respect to any one of the plurality of frames of the upper layer, a frame obtained by taking the average by weighting the lower layer and a frame of the lower layer are synthesized with respect to all of the plurality of frames of the upper layer to generate image information.

The 16th gist of the present invention is a moving image decoding apparatus according to the 8th gist, wherein in the case where there are a plurality of frames of the upper layer between two adjacent frames of the lower layer, when the shape of the parts area for synthesizing the frames of the lower layer is encoded with respect to any one of the plurality of frames of the upper layer, a frame obtained by taking the average by weighting the lower layer and a frame of the lower layer are synthesized with respect to all of the plurality of frames of the upper layer to generate image information.

The 17th gist of the present invention is a moving image encoding apparatus according to the first gist, wherein when the parts area of the lower layer appearing as a background is smaller than the predetermined threshold, the parts area of the upper layer is expanded by using the parts area of the lower layer to generate a parts area of image information.

The 18th gist of the present invention is a moving image encoding apparatus according to the third gist, wherein when the parts area of the lower layer appearing as a background is smaller than the predetermined threshold, the parts area of the upper layer is expanded by using the parts area of the lower layer to generate a parts area of image information.

The 19th gist of the present invention is a moving image encoding apparatus according to the 5th gist, wherein when the parts area of the lower layer appearing as a background is smaller than the predetermined threshold, the parts area of the upper layer is expanded by using the parts area of the lower layer to generate a parts area of image information.

The 20th gist of the present invention is a moving image encoding apparatus according to the 7th gist, wherein when the parts area of the lower layer appearing as a background is smaller than the predetermined threshold, the parts area of the upper layer is expanded by using the parts area of the lower layer to generate a parts area of image information.

The 21st gist of the present invention is a moving image encoding apparatus according to the 9th gist, wherein when the parts area of the lower layer appearing as a background is smaller than the predetermined threshold, the parts area of the upper layer is expanded by using the parts area of the lower layer to generate a parts area of image information.

The 22nd gist of the present invention is a moving image encoding apparatus according to the 10th gist, wherein when the parts area of the lower layer appearing as a background is smaller than the predetermined threshold, the parts area of the upper layer is expanded by using the parts area of the lower layer to generate a parts area of image information.

The 23rd gist of the present invention is a moving image encoding apparatus according to the 11th gist, wherein when the parts area of the lower layer appearing as a background is smaller than the predetermined threshold, the parts area of the upper layer is expanded by using the parts area of the lower layer to generate a parts area of image information.

The 24th gist of the present invention is a moving image encoding apparatus according to the 12th gist, wherein when the parts area of the lower layer appearing as a background is smaller than the predetermined threshold, the parts area of the upper layer is expanded by using the parts area of the lower layer to generate a parts area of image information.

The 25th gist of the present invention is a moving image decoding apparatus according to the second gist, wherein when the frames of the lower layer are synthesized, a pixel value of one of the lower layer frames which exist front and behind of a frame of the lower layer is used, with respect to an area where the first parts area and the second parts area overlap, or an area which is neither the first parts area nor the second parts area.

The 26th gist of the present invention is a moving image decoding apparatus according to the 6th gist, wherein when the lower layer frames are synthesized, a pixel value of one of the lower layer frames which exist front and behind of a frame of the lower layer is used, with respect to an area where the first parts area and the second parts area overlap, or an area which is neither the first parts area nor the second parts area.

The 27th gist of the present invention is a moving image decoding apparatus according to the second gist, wherein when the lower layer frame is synthesized, a pixel value of one of the lower layer frames which exist front and behind of a frame of the lower layer is used, with respect to an area where the first parts area and the second parts area overlap, or an area which is neither the first parts area nor the second parts area, and at the time of the synthesis, interpolation is performed by using a pixel value of a frame of the lower layer with respect to a pixel value outside of one parts area of the lower layer, and using a pixel value in the periphery of the parts area with respect to a pixel value inside of the one parts image of the lower layer.

The 28th gist of the present invention is a moving image decoding apparatus according to the 4th gist, wherein when the lower layer frame is synthesized, a pixel value of one of the lower layer frames which exist front and behind of a frame of the lower layer is used, with respect to an area where the first parts area and the second parts area overlap, or an area which is neither the first parts area nor the second parts area, and at the time of the synthesis, interpolation is performed by using a pixel value of a frame of the lower layer with respect to a pixel value outside of one parts area of the lower layer, and using a pixel value in the periphery of the parts area with respect to a pixel value inside of the one parts image of the lower layer.

The 29th gist of the present invention is a moving image decoding apparatus according to the 6th gist, wherein when the lower layer frame is synthesized, a pixel value of one of the lower layer frames which exist front and behind of a frame of the lower layer is used, with respect to an area where the first parts area and the second parts area overlap, or an area which is neither the first parts area nor the second parts area, and at the time of the synthesis, interpolation is performed by using a pixel value of a frame of the lower layer with respect to a pixel value outside of one parts area of the lower layer, and using a pixel value in the periphery of the parts area with respect to a pixel value inside of the one parts image of the lower layer.

The 30th gist of the present invention is a moving image decoding apparatus according to the 25th gist, wherein when the lower layer frame is synthesized, a pixel value of one of the lower layer frames which exist front and behind of a frame of the lower layer is used, with respect to an area where the first parts area and the second parts area overlap, or an area which is neither the first parts area nor the second parts area, and at the time of the synthesis, interpolation is performed by using a pixel value of a frame of the lower layer with respect to a pixel value outside of one parts area of the lower layer, and using a pixel value in the periphery of the parts area with respect to a pixel value inside of the one parts image of the lower layer.

The 31st gist of the present invention is a moving image decoding apparatus according to the 26th gist, wherein when the lower layer frame is synthesized, a pixel value of one of the lower layer frames which exist front and behind of a frame of the lower layer is used, with respect to an area where the first parts area and the second parts area overlap, or an area which is neither the first parts area nor the second parts area, and at the time of the synthesis, interpolation is performed by using a pixel value of a frame of the lower layer with respect to a pixel value outside of one parts area of the lower layer, and using a pixel value in the periphery of the parts area with respect to a pixel value inside of the one parts image of the lower layer.

BRIEF DESCRIPTION OF DRAWINGS

FIGS. 13a and 13b are views illustrating operation of the image superimposing section provided in the conventional apparatus.

FIGS. 14a to 14c are views illustrating problems of the image superimposing section provided in the conventional apparatus.

BEST MODE FOR CARRYING OUT THE INVENTION

Embodiments of the present invention will now be described in detail with reference to the accompanying drawings.

Figure 11:
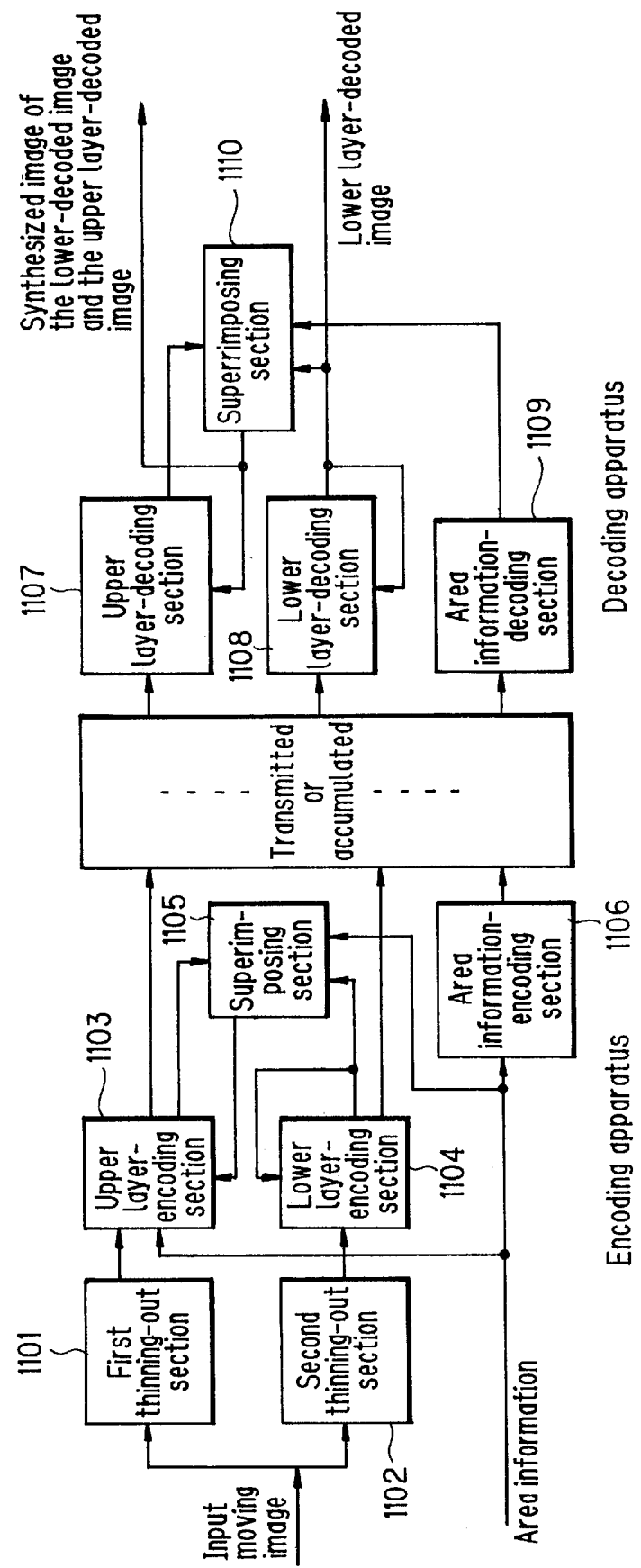
FIG. 11 is a block diagram showing the construction of the moving image encoding apparatus and the moving image decoding apparatus.
Figure 12:
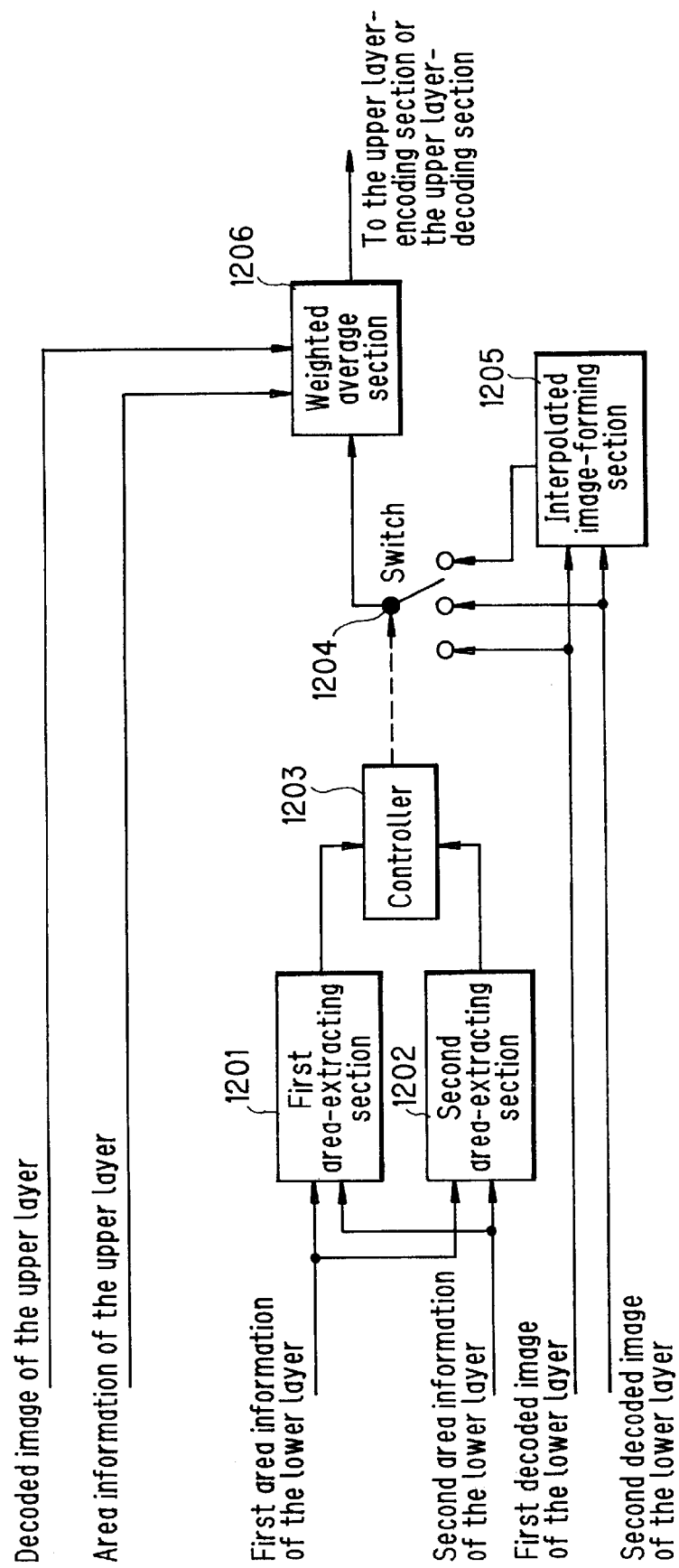
FIG. 12 is a block diagram showing the construction of the image superimposing section provided in a conventional apparatus.
Figure 15:
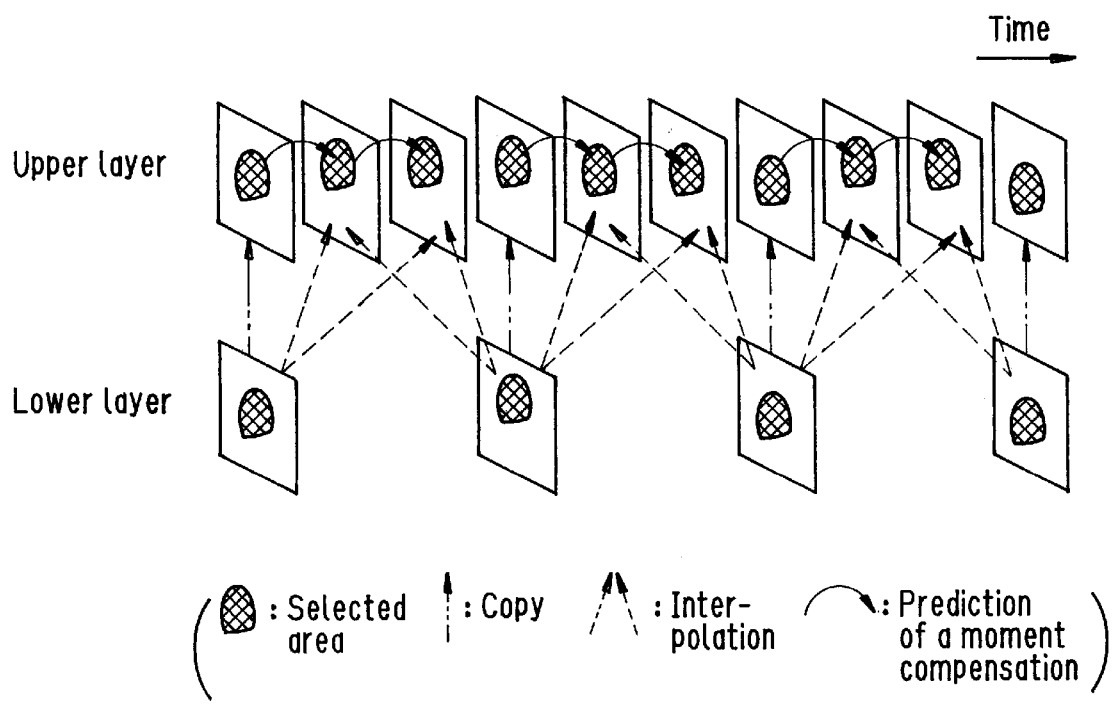
FIG. 15 is a view illustrating the concept of frame synthesis in the moving image encoding apparatus and the moving image decoding apparatus.

The moving image encoding apparatus and the moving image decoding apparatus of the present invention are characterized in a portion corresponding to the image superimposing sections 1105 and 1110 of the conventional apparatus shown in FIG. 11, wherein when a lower layer frame is synthesized, and a lower layer frame and an upper layer frame is superimposed on the synthesized lower layer frame, distortion in the image which looks like an afterimage generated in the periphery of the selected area of the upper layer is suppressed visually.

The first embodiment of the present invention will now be described.

Figure 1:
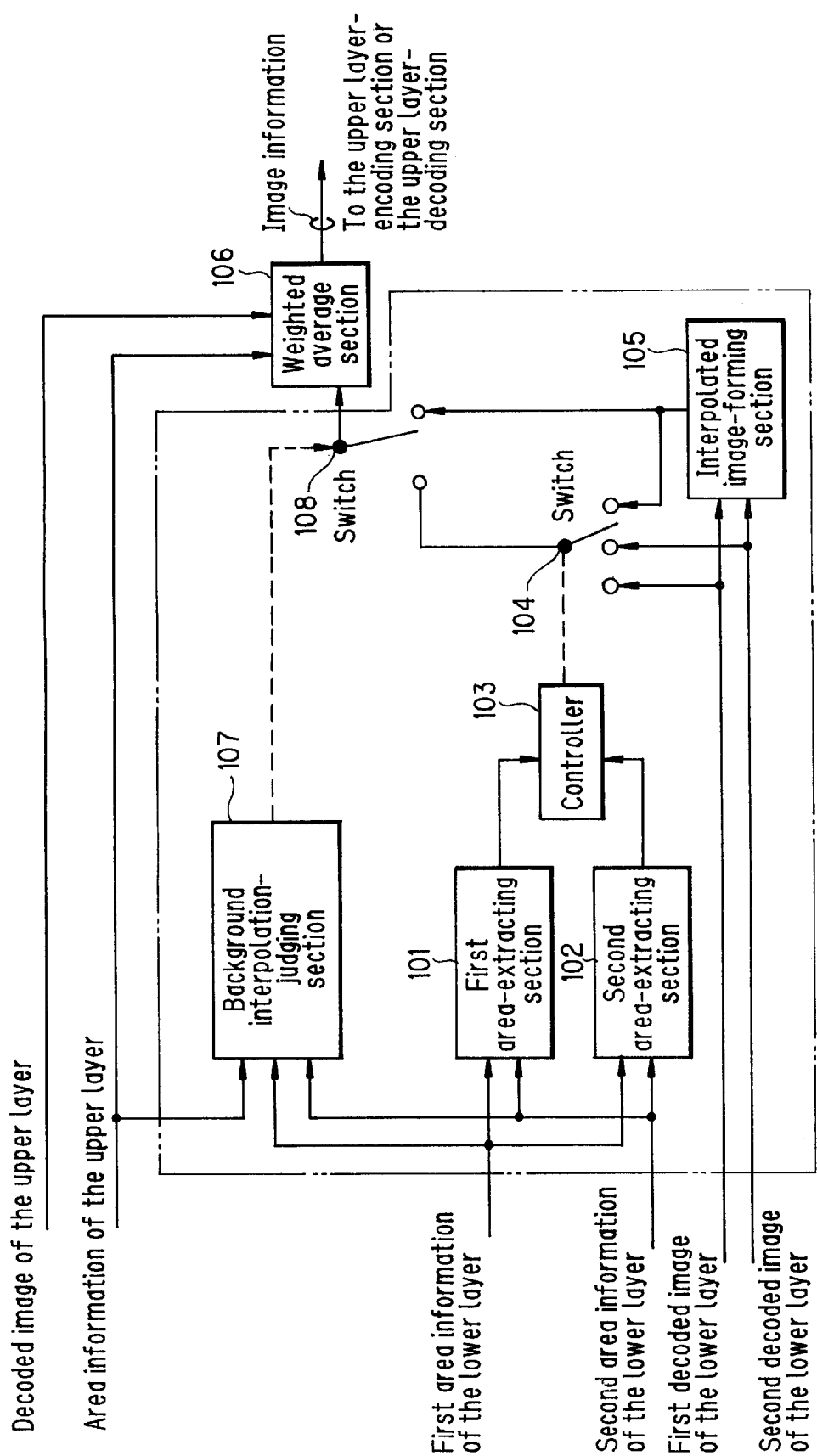
FIG. 1 is a block diagram showing a construction of an image superimposing section provided in a moving image encoding apparatus and a moving image decoding apparatus according to the first embodiment of the present invention.

The moving image encoding apparatus and the moving image decoding apparatus according to this embodiment are for solving the first problem described above, and in the construction of the conventional apparatus shown in FIG. 11, an image superimposing section shown in FIG. 1 is provided instead of the superimposing sections 1105 and 1110.

This image superimposing section interpolates a frame of the lower layer, when a frame corresponding to the upper layer of one moving image sequence does not exist in the lower layer, and superimposes the frame obtained by the interpolation on the parts area of the upper layer as a background to obtain an interpolated image (image information). The interpolated image is used for the prediction encoding/decoding of the upper layer. The apparatus according to this embodiment will now be described based on this image superimposing section.

Referring to FIG. 1, the first area-extracting section 101 extracts an area which is the first area and is not the second area, from the first area information of the lower layer and the second area information of the lower layer. Specifically, in FIG. 13a, when the first area information is expressed by a dotted line (it is assumed that the inside of the dotted line has a value 0, and the outside of the dotted line has a value 1), and the second area information is similarly expressed by a broken line, the area extracted by the first area-extracting section 101 is the hatched portion in FIG. 13a.

The second area-extracting section 102 in FIG. 1 extracts an area which is the second area and is not the first area, from the first area information of the lower layer and the second area information of the lower layer. In the case of FIG. 13a, the meshed portion is extracted.

A controller 103 in FIG. 1 is a section for controlling a switch 104 with an output of the first area-extracting section 101 and the second area-extracting section 102. That is to say, when the position of a target pixel is only in the first area, the switch 104 is connected to the second decoded image side, and when the position of the target pixel is only in the second area, the switch 104 is connected to the first decoded image side, and when the position of the target pixel is in other areas, the switch 104 is connected to the output from the interpolated image-forming section 105.

The interpolated image-forming section 105 in FIG. 1 calculates the interpolated image of the first decoded image of the lower layer and the second decoded image of the lower layer, according to the expression (1) described in the above "Prior Art" section. Here, in the expression (1), B (x, y, t1) is the first decoded image, B (x, y, t2) is the second decoded image, I (x, y, t3) is the decoded image, wherein t1, t2 and t3 are the time of the first decoded image, of the second decoded image and of the interpolated image, respectively.

The weighted average section 106 in FIG. 1 superimposes the interpolated image prepared according to the above expression (2) and the decoded image of the upper layer.

The background interpolation-judging section 107 judges whether the synthesizing processing for suppressing a distortion such as the above-mentioned afterimage is to be performed or not, depending upon the size of an area where the upper layer expressed by meshes in FIG. 14c cannot cover the above-mentioned two areas of the lower layer (that is, the parts area of the lower layer appearing as a background), based on the three area information, i.e., the first area information of the lower layer, the second area information of the lower layer, and the area information of the upper layer.

When the above-mentioned area is larger than a predetermined threshold, a switch 108 is connected to the left side (the output side of a switch 104), to perform the synthesizing processing followed by the background interpolation. That is to say, a frame obtained by taking the average by weighting the lower layer and a frame of the lower layer are subjected to the synthesizing processing followed by the background interpolation, to generate image information for prediction encoding/decoding the upper layer.

On the other hand, when the above-mentioned area is smaller than a predetermined threshold, the switch 108 is connected to the right side (the output side of an interpolated image-forming section 105), and the output of the interpolated image-forming section 105 is used as the lower layer to be synthesized with the upper layer. That is to say, the interpolated image-forming section 105 provides the image obtained by taking the average by weighting the lower layer via the switch 108 to the weighted average section 106.

The weighted average section 106 then superimposes this image on the upper layer as a background to generate image information for prediction encoding/decoding the upper layer. In this case, (when the above-mentioned area is below the predetermined threshold), since both the first area information and the second area information of the lower layer are not used with the apparatus of this embodiment, these information is not encoded. Hence, the amount of codes for the area information can be reduced.

Figure 6:
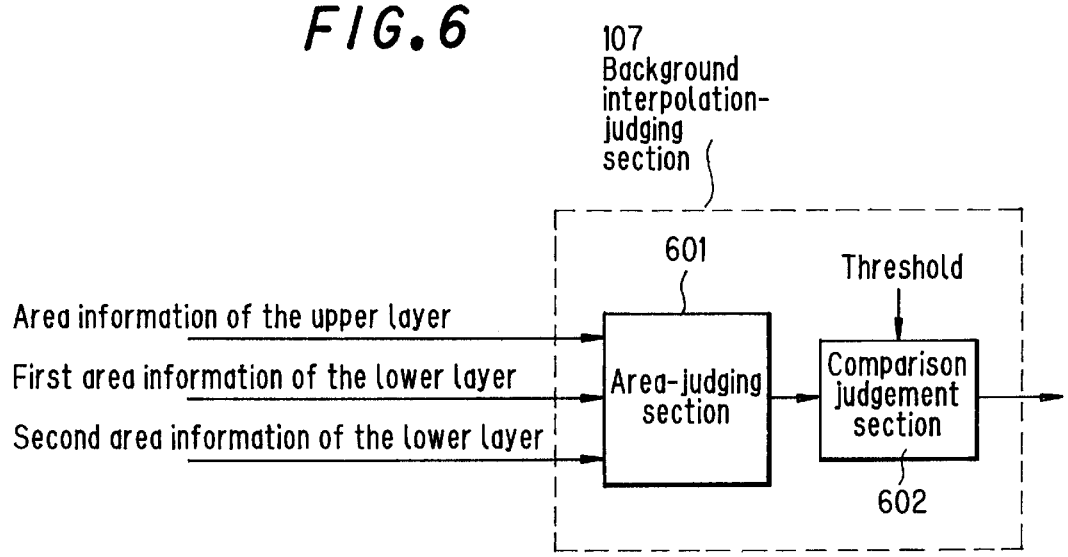
FIG. 6 is a block diagram showing a construction of a background interpolation judging section provided in the image superimposing section of an apparatus according to the first embodiment of the present invention.

FIG. 6 is a block diagram showing the construction of the background interpolation-judging section 107 of FIG. 1. In this embodiment, the judgement if the above-mentioned synthesizing processing is to be performed or not is performed depending upon the size of the meshed portion in FIG. 14c. As other methods to realize this, for example, a method using size of the area may be used. The area-judging section 601 of FIG. 14a is a section for calculating the size, and when it is assumed that the parts area of screen A (foreground area) of FIG. 14a is Fr (A), and the parts area of screen C is Fr (C), and the background area of screen B is Br (B), the area can be expressed as:

$$\{Fr(A) \cup Fr(C)\} \cap Br(B), \qquad (3)$$

wherein '∪' in this expression denotes a union of a set, and '∩' denotes a meet of the set.

Furthermore, the size of the area can be expressed by the number of pixels in the area expressed by the expression (3). Alternatively, the size of the area may be obtained by normalizing the number of pixels in the area by the number of images of the whole image. Moreover, there can be considered, in addition to the area, the length of the periphery of the area, the area of a square circumscribing of the area and the like, but these values are required to be normalized by using the number of pixels of the whole screen and the size, as in the calculation of the area described above.

As shown in FIG. 14, when the area of Fr (A) ∩Fr (C) (it is assumed to be Fr (D)) is all included in Fr (C), the area can be determined by using the expression (3), but in general, the area is expressed by:

$$\{\{(Fr(A) \cup Fr(C)) \cap Br(D)\} \cap Br(B), \quad (4)$$

wherein Br (D) denotes a background area of the screen in which Fr (D) is designated as the parts area.

The comparison judgement section 602 of FIG. 6 compares the area obtained by the area-measuring section 601 with the threshold determined in advance (the predetermined threshold), and if the area is larger than the threshold, the switch 108 shown in FIG. 1 is connected to the switch 104 side, to perform the synthesizing processing. If the area is smaller than the threshold, the switch 108 is connected to the interpolated image-forming section 105 shown in FIG. 1, and without performing the synthesizing processing, the interpolated image calculated according to the expression (1) is provided to the weighted average section 106.

Up to this point, it has been assumed that the interpolated image-forming section 105 in FIG. 1 prepares an interpolated image by using the expression (1), but instead of preparing the interpolated image, one of frames before and behind of the lower layer may be directly designated as an output of the interpolated image-forming section 105. For example, if it is assumed that the time of the two lower layer frames is t1 and t2, respectively, and the time of the upper layer is t3 (provided that t1<t3<t2), when a pixel of the lower layer frame closer to the time of the current upper layer frame is used, the interpolated pixel I (s, y, t3) is calculated by the following expression (5a) or (5b).

In case of t3−t1<t2−t3, $$I(x, y, t3) = B(x, y, t1) \quad (5a)$$

In case of t3−t1>t2−t3, $$I(x, y, t3) = B(s, y, t2) \quad (5b)$$

Figure 16:
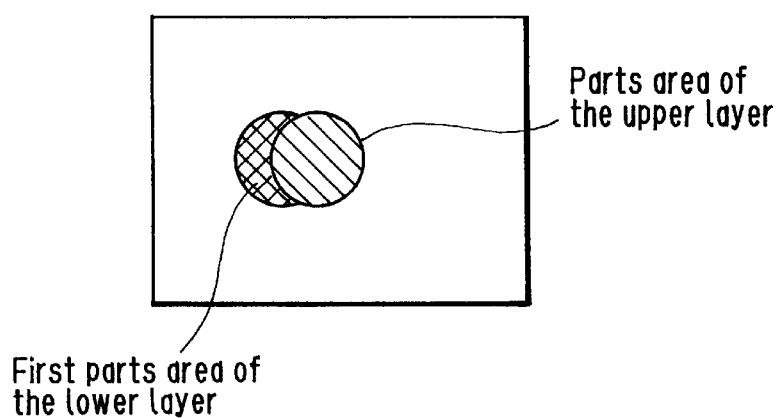
FIG. 16 is a view illustrating the operation of an interpolated image-forming section provided in the image superimposing section of the apparatus according to the first embodiment.

In this case, the distortion area shown by a meshed portion in FIG. 14c (that is, the area interpolated by the background interpolation) becomes the meshed portion in FIG. 16. Therefore, as the area used for the judgement of the background interpolation-judging section 107 in FIG. 1, the meshed portion of FIG. 16 is used. If the same symbols in the expression (3) are used, the area (meshed portion in FIG. 16) can be expressed by the following expression (6):

$$\{Fr(a) \cap Br(D)\} \cap Br(B) \quad (6)$$

When the background portion changes with time, with the above method, the lower layer may not be synthesized well. In such a case, in the invoked FIG. 14, with respect to the area of Br (A), the pixel value of the image C is copied, and with respect to the area of Fr (A), the pixel value in the periphery of Fr (A) is used to interpolate the pixel value, thus the background can be simply synthesized.

Figure 18:
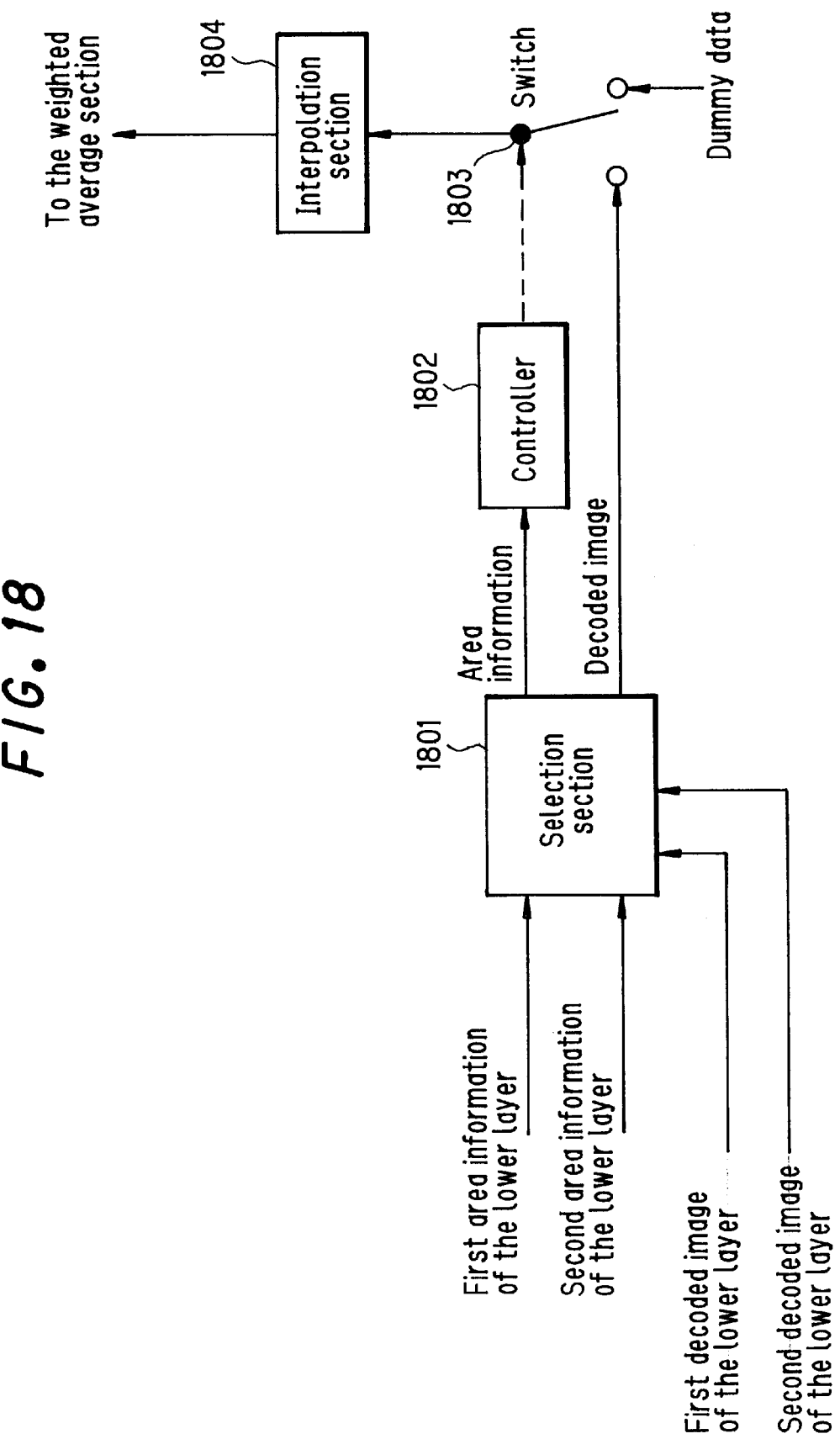
FIG. 18 is a block diagram showing another construction of the image superimposing section provided in the apparatus according to the embodiment of the present invention.

The construction of the image superimposing section for realizing this method can be obtained by replacing the construction surrounded by a two-dot chain line in FIG. 1 by the construction shown in FIG. 18. Here, it is assumed that there is no input of the area information of the upper layer.

Here, the selection section 1801 shown in FIG. 18 selects a frame of the two lower layer frames closer to the current upper layer frame. The area information selected by the selection section 1801 is input to the controller 1802 and the interpolation section 1804, and the decoded image (pixel information) is input to the switch 1803. The controller 1802 controls the switch 1803, and provides a dummy data to the interpolation section 1804, if the pixel of the image of the lower layer to be synthesized is inside the area (for example, Fr (A)), and provides a pixel value of the decoded image to the interpolation section 1804, if the pixel of the image of the lower layer to be synthesized is outside the area (for example, Br (A)).

The interpolation section 1804 determines the pixel value inside the area by the interpolation from the pixel value in the periphery thereof. Since the interpolation processing is performed by using the background information (pixel value), the pixel value of the interpolated area (inside the area) becomes closer to that of the background image, thereby visual deterioration of the image quality is alleviated. As a specific interpolation method, there can be mentioned a padding method, shown in a literature, "MPEG 4 Video Verification Model Version 2.0" (ISO/IEC JTC1/SC29 n1260, 1996). In addition to this, there can be used an interpolation method using a mean value of the pixel value of the background area or using a certain value determined in advance, or an interpolated image-forming method in which texture information of the background area is reproduced by utilizing a fractal.

The second embodiment of the present invention will now be described. This embodiment is for solving the second problem described above, and FIG. 2 is a block diagram showing a construction of the image superimposing section provided in this embodiment. The first area-extracting section 101, the second area-extracting section 102, the controller 103, the switch 104, the interpolated image-forming section 105, and the weighted average section 106 shown in FIG. 2 are the same as in FIG. 1, therefore, detailed description of them will be omitted.

Figure 2:
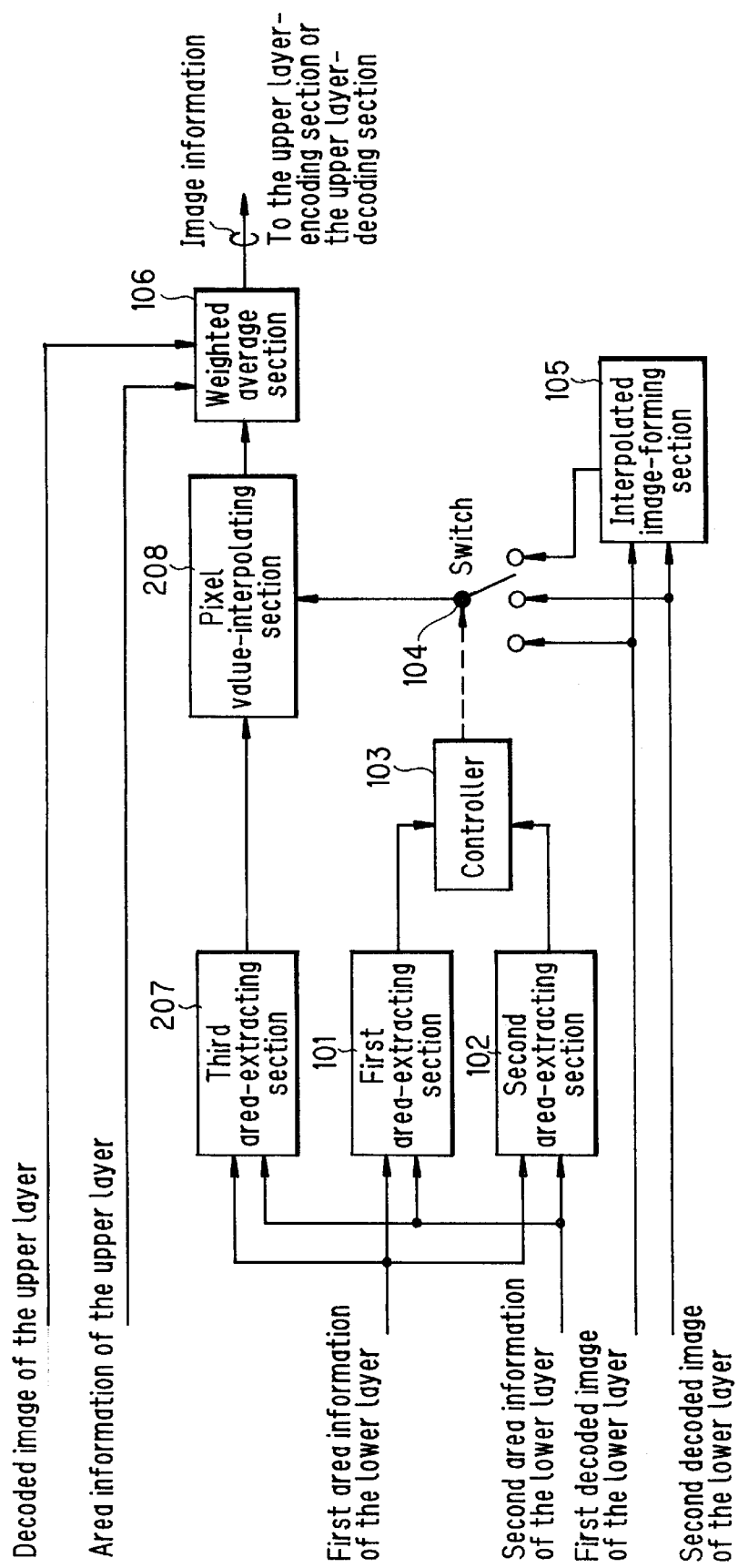
FIG. 2 is a block diagram showing a construction of the image superimposing section provided in the moving image encoding apparatus and the moving image decoding apparatus according to the second embodiment of the present invention.

The third area-extracting section 207 in FIG. 2 extracts an area where the first area and the second area of the lower layer intersect (that is, an overlapped area of the parts area in the lower layer appearing as a background). In an example of FIG. 13a, the white area surrounded by a dotted line and a broken line corresponds to this area.

The pixel value-interpolating section 208 in FIG. 2 interpolates the area extracted by the third area-extracting section 207. That is to say, the pixel value-interpolating section 208 interpolates a pixel value in the above-mentioned area (overlapped area) based on the information adjacent to the periphery (that is, a pixel value in the periphery of the overlapped area of the parts area in the lower layer appearing as a background) of the synthesized pixel prepared by the controller 103 and the switch 104. Thereby, the image information for prediction-encoding/decoding the upper layer is generated. This interpolation processing is similar to that of the interpolation section 1804 shown in FIG. 18 as described above.

The third embodiment of the present invention will now be described. The apparatus of this embodiment is to solve the first and the second problems described above, and is constituted by incorporating an adaptable background interpolation-judging device described in the first embodiment into the second embodiment.

Figure 3:
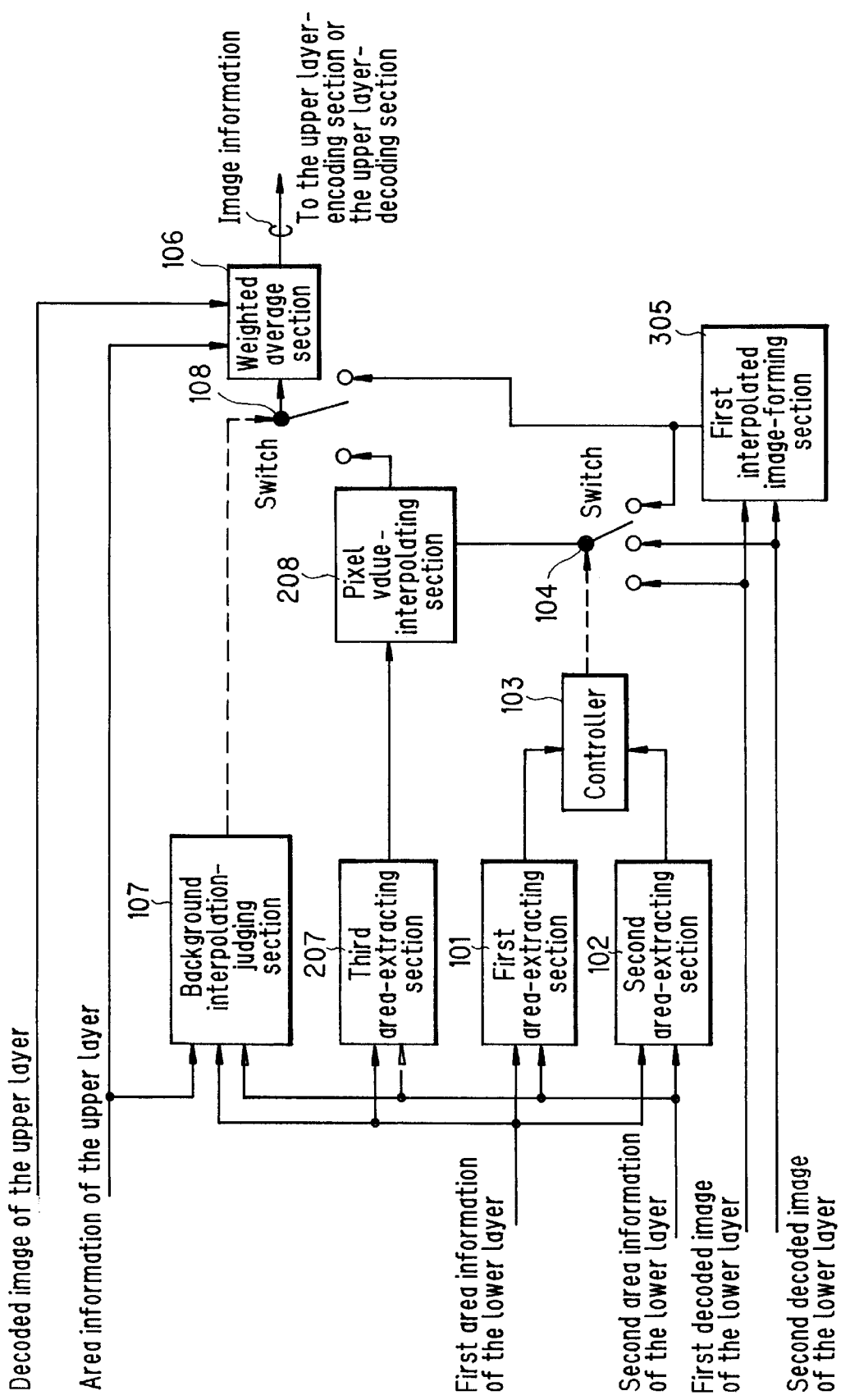
FIG. 3 is a block diagram showing a construction of the image superimposing section provided in the moving image encoding apparatus and the moving image decoding apparatus according to the third embodiment of the present invention.

FIG. 3 is a block diagram showing a construction of the image superimposing section provided in the third embodiment. The first area-extracting section 101, the second area-extracting section 102, the controller 103, the switch 104, the interpolated image-forming section 105, the background interpolation-judging section 108, the weighted average section 106 and the switch 110 operate similarly as those shown in FIG. 1, and the third area-extracting section 207 and the pixel value-interpolating section 208 operate similarly as those shown in FIG. 2, therefore, description of them will be omitted here.

As described above, the apparatus of this embodiment has the construction of the first embodiment and the second embodiment, hence it not only can avoid useless encoding of the shape information in the case where the movement is minor and the effect of interpolation cannot be seen, but also alleviate deterioration of the image quality resulting from a reciprocating (turning back) movement of the parts area in the upper layer.

The fourth embodiment of the present invention will now be described. This embodiment is to solve the first, the second and the fourth problems described above, and FIG. 4 is a block diagram showing a construction of the image superimposing section provided in the apparatus of this embodiment.

Figure 4:
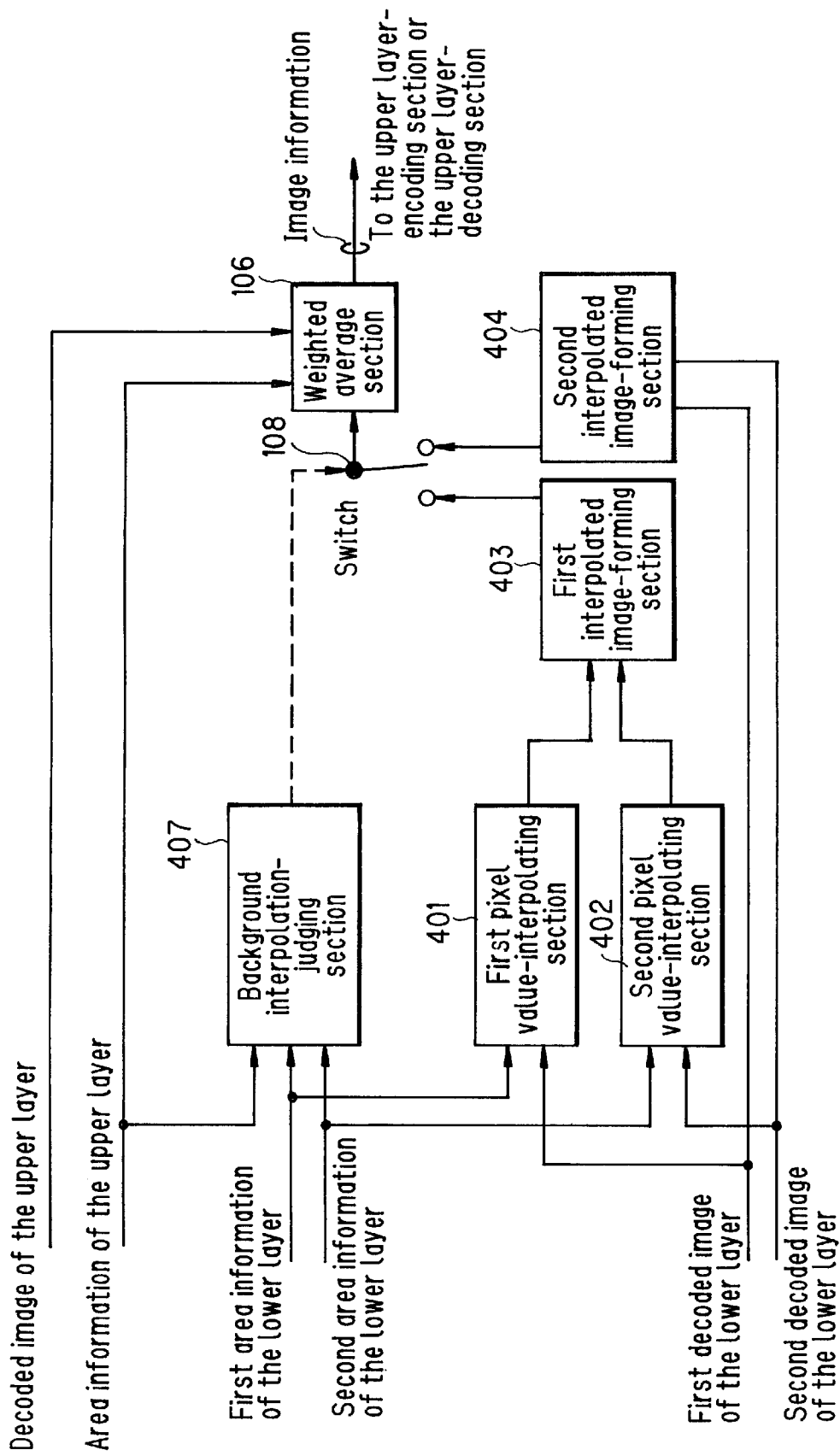
FIG. 4 a block diagram showing a construction of the image superimposing section provided in the moving image encoding apparatus and the moving image decoding apparatus according to the fourth embodiment of the present invention.

Here, the first pixel value-interpolating section 401 in FIG. 4 interpolates the first parts area in the first decoded image of the lower layer, as in the pixel value-interpolating section 208 of FIG. 2. Similarly, the second pixel value-interpolating section 402 in FIG. 4 interpolates the second parts area in the second decoded image of the lower layer. Since the specific operation has been already described for the pixel value-interpolating section 208 in FIG. 2, here the description will be omitted.

The first interpolated image-forming section 403 in FIG. 4 interpolates the output of the first pixel value-interpolating section 401 and the second pixel value-interpolating section 402 according to the expression (1) described above. On the other hand, the second interpolated image-forming section 404 in FIG. 4 interpolates the first decoded image and the second decoded image of the lower layer according to the expression (1), as in the first interpolated image-forming section 403. Either of the interpolated image-forming section performs the same operation as that of the interpolated image-forming section 105 in FIG. 1, therefore the description thereof will be omitted here. Moreover, the weighted average section and the switch are the same as those shown in FIG. 1.

The background interpolation-judging section 407 in FIG. 4 is a section for judging if the synthesizing processing is to be performed or not, as in the background interpolation-judging section 107 in FIG. 1, and the background image (lower layer superimposed on the upper layer) provided to the weighted average section 106 is determined based on this judgement. That is to say, when the background interpolation-judging section 407 judges that the parts area of the lower layer appearing as a background is larger than the predetermined threshold, the weighted average section 106 inputs the pixel value in the periphery of the parts area of the lower layer from the first interpolated image-forming section 403, and interpolates the pixel value inside of the parts area by using the input pixel value to generate image information.

Furthermore, when the background interpolation judging section 407 judges that the parts area appearing as a background is smaller than the predetermined threshold, the weighted average section 106 inputs an image obtained by taking the average by weighting the lower layer from the second interpolated image-forming section 404, and interpolates the pixel value inside the parts area by using the input pixel value to generate image information.

The present invention is to simplify the synthesizing processing in the conventional example, thereby the scale of the hardware can be reduced without causing big deterioration in the image quality.

It is assumed that the second interpolated image-forming section 404 shown in FIG. 4 of this embodiment performs interpolation according to the expression (1), but it may be so constituted that the second interpolated image-forming section 404 performs interpolation using a pixel of the lower layer frame temporally close to the current upper layer according to the expression (5). That is to say, for example, when a temporally former lower layer frame is temporally close to the upper layer, the background interpolation-judging section 407 judges whether the background interpolation is to be performed or not based on the area expressed by the expression (6). In addition, the first interpolated image-forming section 403 in FIG. 4 directly outputs the image prepared by the first pixel value-interpolating section 401.

The fifth embodiment of the present invention will now be described. This embodiment is to solve the first problem described above, wherein when the difference in the position and shape between the first parts area and the second parts area of the lower layer is small, the amount of codes required for the second parts area information is reduced by replacing the second parts area by the first parts area.

Figure 5:
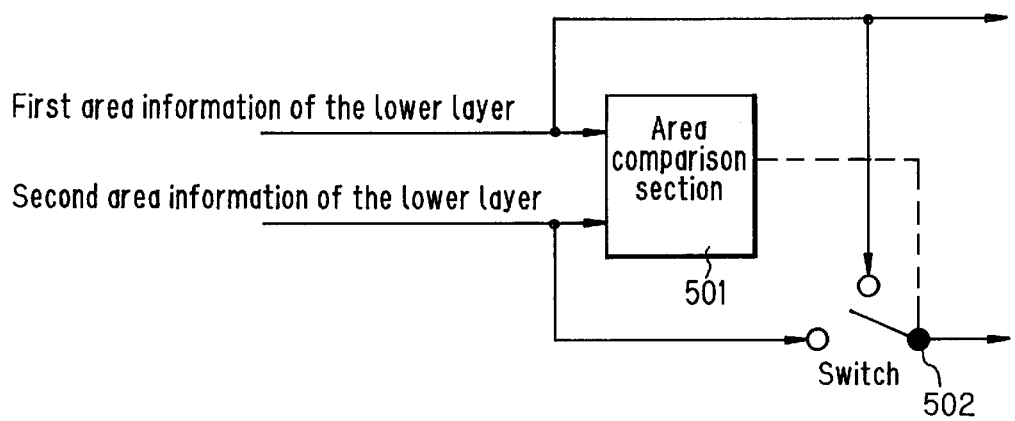
FIG. 5 is a block diagram showing a construction of an area information changing section provided in the moving image encoding apparatus and the moving image decoding apparatus according to the fifth embodiment of the present invention.

The image superimposing section provided in the apparatus of this embodiment has a constituent shown in FIG. 5 in the input section of the first area information and the second area information of the lower layer, in the construction shown in FIG. 1 to FIG. 4.

Figure 9:
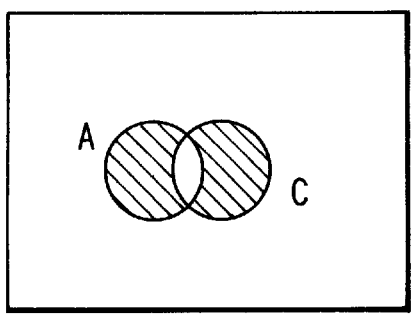
FIG. 9 is a diagram illustrating operation of an apparatus according to the fifth embodiment of the art of the present invention.
Figure 10:
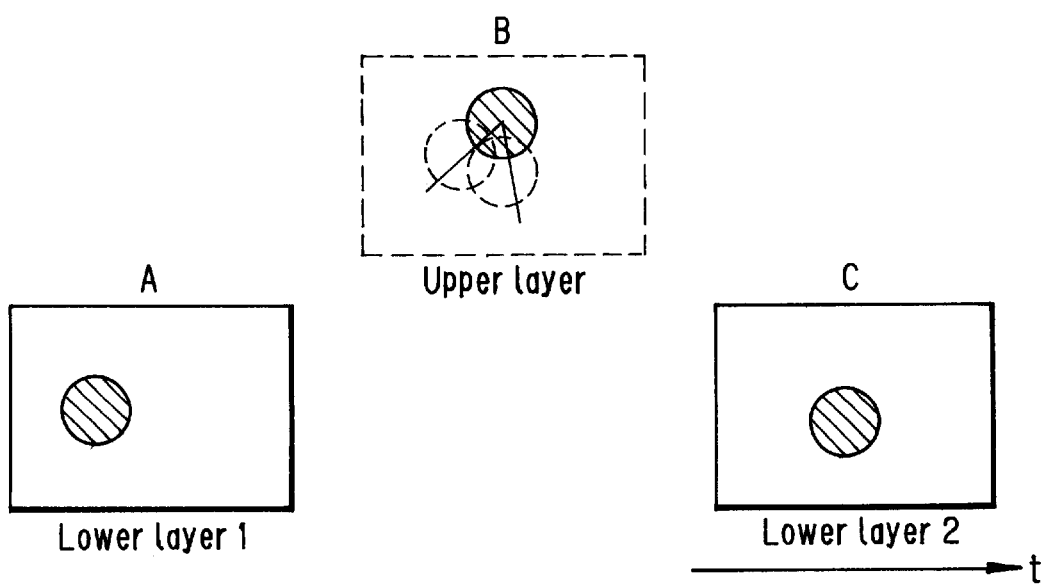
FIG. 10 is a diagram illustrating problems of the conventional apparatus.

Here, the comparison section 501 in FIG. 5 is a section for judging the difference between the two area information of the lower layer. If the parts image of the lower layer moves not so significantly, and the change in the area information which shows the movement is small, instead of utilizing the second area information of the lower layer, the switch 502 in FIG. 5 is connected to the upper side, to output the first area information of the lower layer, thereby the area information required to be encoded is reduced by 1. Furthermore, when the parts area of the lower layer moves largely, the switch is connected to the lower side, to output the respective area information. As a material for judgment of the change in the area information, for example, the dimension of the hatched portion shown in FIG. 9 may be used.

Figure 7:
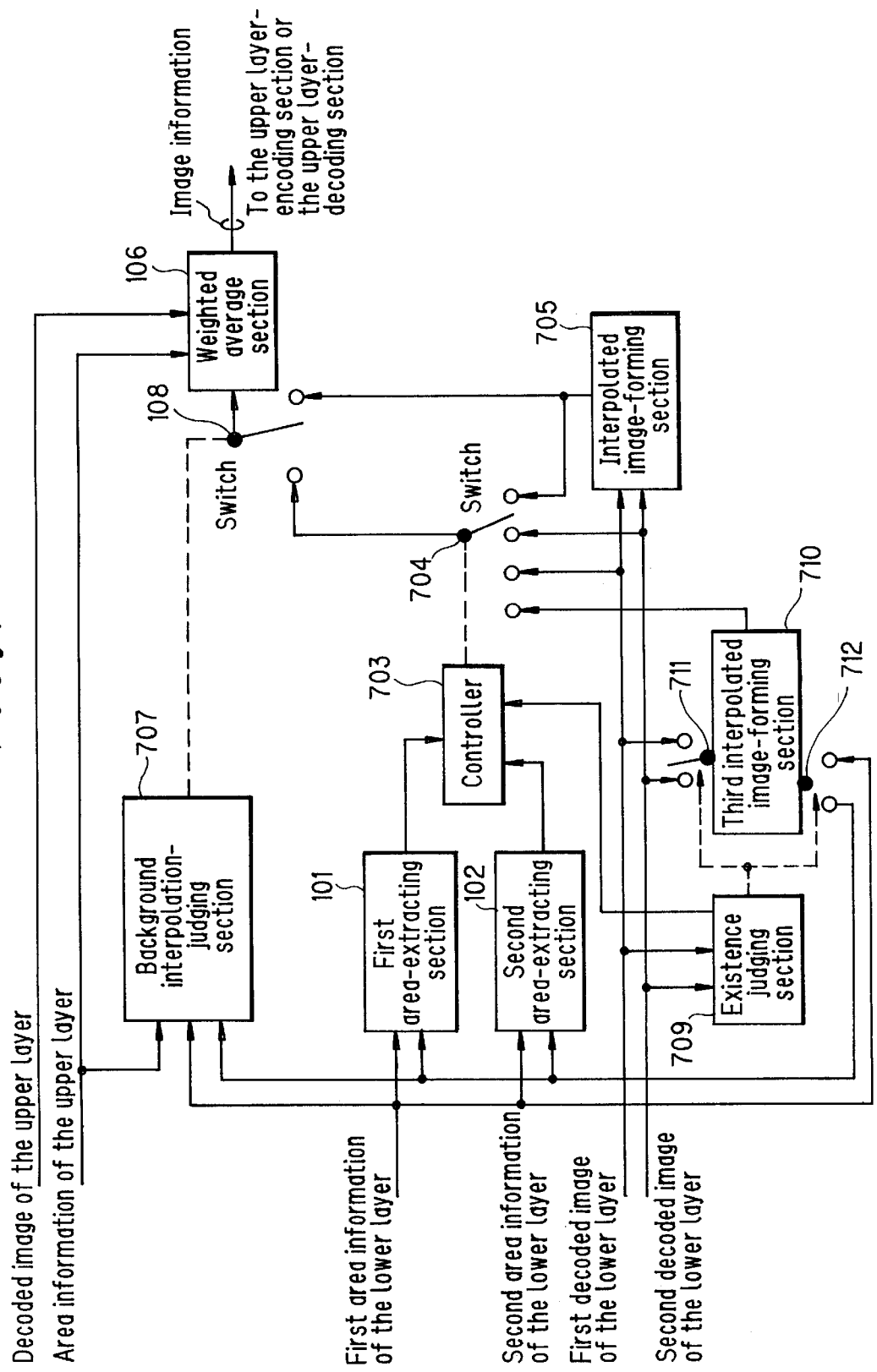
FIG. 7 is a block diagram showing a construction of the image superimposing section provided in an apparatus according to the 6th embodiment of the present invention.
Figure 8:
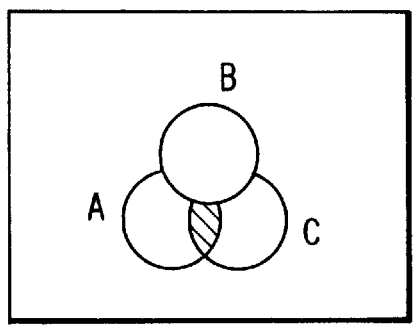
FIG. 8 is a diagram illustrating problems of the conventional apparatus.

The sixth embodiment of the present invention will now be described. This embodiment is to solve the third problem described above. FIG. 7 is a block diagram showing a construction of the image superimposing section constituting an apparatus according to this embodiment. As shown in this figure, the image superimposing section provided in this apparatus is composed of an existence judging section 709, a third interpolated image-forming section 711, and switches 711 and 712 in addition to the construction of the first embodiment.

The operation of the first area-extracting section 101, the second area-extracting section 102, the weighted average section 106 and the switch 108 are the same as in FIG. 1, therefore, the description thereof will be omitted here. The controller 703, the switch 704, and the interpolated image-forming section 705 correspond to the controller 103, the switch 104, and the interpolated image-forming section 105, respectively.

First, when the background interpolation-judging section 707 judges that the parts area of the lower layer appearing as a background is larger than the predetermined threshold, the switch 108 is connected to the left side (the output of the switch 704). Then, the existence judging section 709 in FIG. 7 judges whether the first decoded image and the second decoded image of the lower layer exist or not, that is, whether the number of frames of the lower layer required for the background interpolation is satisfied or not.

Here, when the existence judging section 709 judges that one of the decoded images is not input, it connects the switch 704 to the leftmost side (the output of the third interpolated image-forming section 711) via the controller 703. At the same time, the switch 711 and the switch 712 are connected so that the existing decoded image and the area information corresponding thereto are input to the third interpolated image-forming section 710. For example, when the second decoded image which is the temporally later decoded image does not exist, the switches are connected so that the first decoded image and the first area information are input.

Then, the third interpolated image-forming section 710 in FIG. 7 performs interpolation processing of the parts area inside the decoded image by using a pixel value in the periphery thereof, with the similar operation as that of the pixel value-interpolating section 208 in FIG. 2. When it has been judged by the existence judging section 709 that one input is lacking, since the switch 704 is connected to the leftmost side, in this case, the output of the third interpolated image-forming section 710 is used for the superimposition of the image frame.

Among the interpolated image-forming section 705 and the background interpolation-judging section 707 in FIG. 7, there is a case where one input is lacking. In this case, the interpolated image-forming section 707 in FIG. 7 judges whether the background interpolation is to be performed or not by using the size of the area which cannot be covered by the parts area of the upper layer among the parts area of the input lower layer. Moreover, the interpolated image-forming section 705 does not perform interpolation, and directly outputs the decoded image.

In the first to the sixth embodiments described above, the judgement whether the background interpolation is to be performed or not is performed with respect to each upper layer frame. However, when there are a plurality of upper layer frames between two continuous lower layer frames, the background interpolation may be performed as described below.

That is to say, judgement whether the background interpolation is to be performed or not is performed with respect to each frame of the plurality of upper layer frames (upper layer frames whose counterparts do not exist in the lower layer), and when all the respective judgement results are not to perform the background interpolation, the background interpolation is not performed with respect to all the plurality of upper layer frames. In this case, the upper layer frame is superimposed on the interpolated image of the two lower layer frames before and behind or superimposed on the lower layer frame temporally closer.

Furthermore, when it is judged to perform the background interpolation with respect to at least one upper layer frame (when the parts area of the lower layer appearing as a background for any one of the plurality of upper layer frames is larger than the predetermined threshold), the lower layer frame synthesized by the background interpolation is superimposed on all the plurality of upper layer frames.

Specifically, a frame obtained by taking the average by weighting the lower layer and a frame of the lower layer are synthesized with respect to all the plurality of upper layer frames to generate image information. In this case, among frames of the plurality of upper layer frames, for example, with respect only to the temporally first frame, the background interpolation is performed to synthesize the lower layer frame, and with respect to other upper layer frames, the lower layer frame synthesized for the first upper layer frame may be directly used.

Furthermore, with an apparatus of the first to the sixth embodiments, when distortion of the image shown by a meshed portion in FIG. 14c and FIG. 16 is large, this distortion is removed by the background interpolation. However, when the distortion of the image is small, the background interpolation is not performed, and the distortion of the image slightly exists. Though the distortion of the image in this case is not visually conspicuous, the distortion can be suppressed so as not to be caused visually as follows.

That is to say, when the upper layer is encoded, the parts area of the lower layer shown by the meshed portion in FIG. 14c and FIG. 16 is also encoded together with the parts area of the upper layer. For that purpose, the parts area of the upper layer is changed so that it includes the hatched portion and the meshed portion of FIG. 14c and FIG. 16 (enlarged/expanded).

Figure 17:
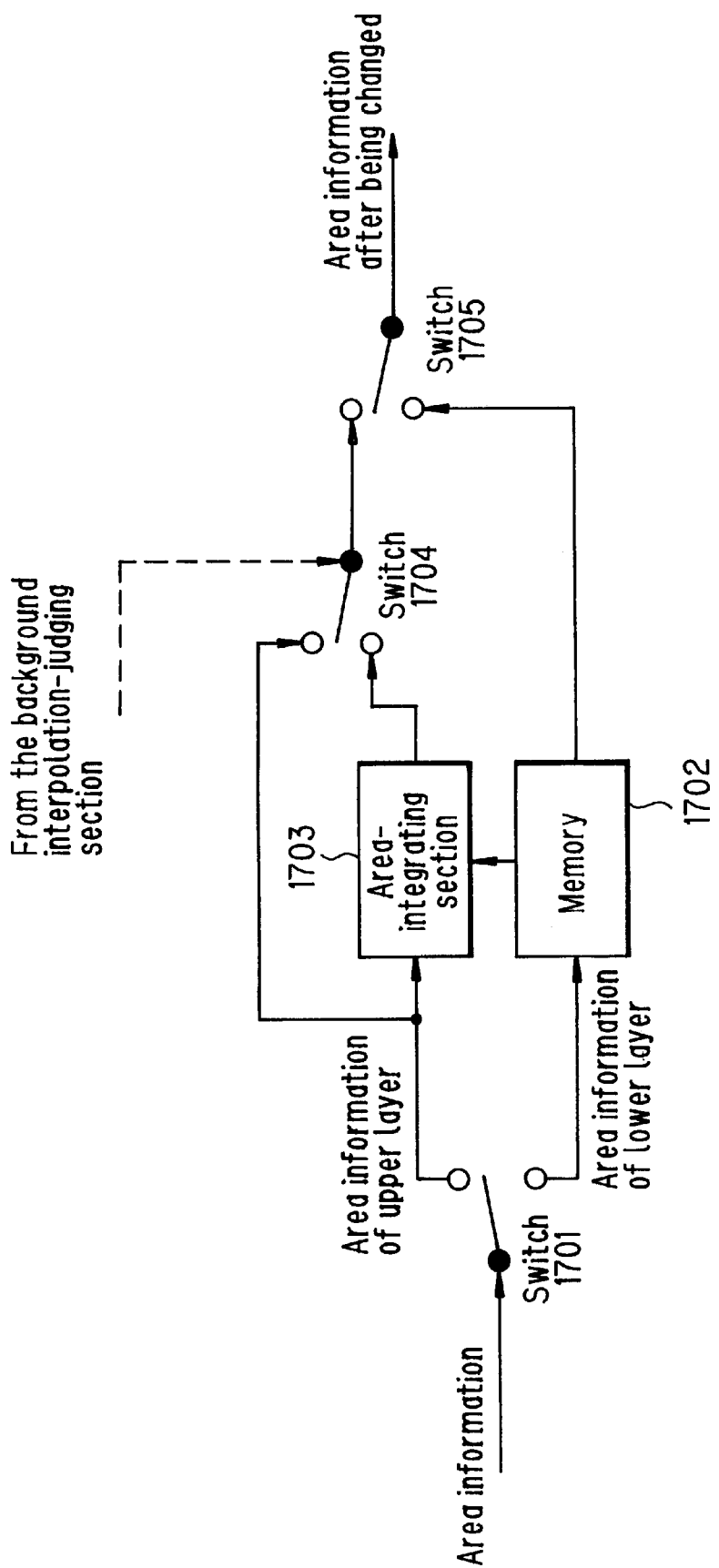
FIG. 17 is a block diagram showing the construction of an area information changing section provided in an apparatus according to the embodiment of the present invention.

FIG. 17 is a block diagram of an area changing section for performing processing of changing the parts area. This area changing section enlarges the parts area of the upper layer by using the parts area of the lower layer to generate a parts area of the image information, thereby changes the area information provided to the upper layer encoding section 1103 shown in FIG. 11.

The operation of each constituent of the area changing section shown in FIG. 17 will now be described. In this figure, a switch 1701 separates the area information into the area information of the upper layer and the area information of the lower layer. A memory 1702 in FIG. 17 stores temporarily the area information of the lower layer. An area integrating section 1703 integrates the area information of the upper layer and a part of the area information of the lower layer to prepare new area information.

Specifically, for example, when the interpolated image-forming section 105 in FIG. 1 prepares an interpolated image according to the expression (1), the meshed portion in FIG. 14c is integrated into the area information of the upper layer to prepare new area information. Moreover, when the interpolated image-forming section 105 is so constructed that a temporally close lower layer is selected according to the expression (5) to prepare an interpolated image, the meshed portion in FIG. 16 is integrated into the area information of the upper layer.

A switch 1704 in FIG. 17 is connected to the upper side (the area information of the upper layer) when the background interpolation is carried out, and connected to the lower side (the output of the area-integrating section 1703) when the background interpolation is not carried out. Moreover, a switch 1705 is connected to the upper side while the area information of the upper layer is being processed, and connected to the lower side while the area information of the lower layer is being processed, synchronously with the switch 1701.

As described above, when the background interpolation is not carried out, the distortion of the image can be suppressed so as not to be caused, by changing the area information of the upper layer to be expanded/enlarged.

INDUSTRIAL APPLICABILITY

As understood from the above description, according to the present invention, the following effects can be obtained.

First, when the parts area in the images of the lower layer and the upper layer moves not so significantly, and even if the background interpolation is carried out, a visual effect cannot be obtained, the background interpolation is not performed. On the contrary, when the parts area moves significantly, the background interpolation is carried out, thereby the shape information for the background interpolation can be reduced, and the image quality can be improved by the reduction of the information.

Secondly, when the parts image in the images of the lower layer and the upper layer performs reciprocating movement, turning back movement, or a movement of changing the direction instead of moving in one direction, interpolation is performed with respect to an area where the parts image areas of the lower layer overlap by using a pixel value in the periphery thereof, hence visual deterioration of the image quality can be alleviated.

Furthermore, when a lower layer which is temporally before and behind the image of the upper layer to be encoded does not exist, by using only the existing lower layer and using a pixel value in the periphery thereof to interpolate the parts image area, apparent deterioration of the image quality can be alleviated.

Moreover, the processing is simplified by the interpolation using a pixel value in the periphery of the parts image area without changing over the screen to be used for the interpolation processing of the parts image area for every area, hence the scale of the hardware can be reduced.

In addition, when there are a plurality of upper layer frames between two continuous lower layer frames, at the time of the background interpolation, the background interpolation is performed only to the first upper layer frame of the plurality of upper layer frames, thereby the amount of the background interpolation processing and the amount of codes of the parts area information of the lower layer required for the background interpolation can be reduced.

Furthermore, in the case where the background interpolation is not performed, when the upper layer is encoded, the area interpolated by the background interpolation is also encoded together with the parts area of the upper layer, thereby the distortion of the image which may be caused because the background interpolation is not performed can be suppressed so as not to be caused visually.

What is claimed is:

1. A moving image encoding apparatus comprising:
    means for separating one moving image sequence into a lower layer having a low frame rate and an upper layer having a high frame rate;
    lower layer encoding means for encoding the whole image in said moving image sequence in said lower layer;
    upper layer encoding means for encoding a partial area of the image in said moving image sequence in said upper layer;
    area information encoding means for encoding area information indicating a shape of the partial area of the image in said moving image sequence; and
    superimposition means which, in the case where there is no lower layer frame corresponding timewise to said upper layer frame, generates a lower layer frame corresponding timewise to said upper layer frame as a background image, by using a lower layer frame existing timewise before or after thereof, and superimposes the parts image of said upper layer frame on said background image,
    said moving image encoding apparatus using the image prepared by said superimposition means to prediction encoding said upper layer,
    wherein, in the case where the parts image area in said lower layer frame which cannot be covered with the parts image in said upper layer frame is larger than a predetermined threshold, said superimposition means generates said background image by synthesizing a frame obtained by taking the weight average of the lower layer frames existing timewise before and after said upper layer frame, and a lower layer frame existing timewise before or after said upper layer frame, and in the case where the parts image area in said lower layer frame which cannot be covered with the parts image in said upper layer frame is smaller than the predetermined threshold, said superimposition means generates said background image by taking the weight average of the lower layer frames existing timewise before and after said upper layer frame.

2. A moving image encoding apparatus according to claim 1, wherein, in the case where the parts image area in said lower layer frame which cannot be covered with the parts image in said upper layer frame is larger than the predetermined threshold, said superimposition means generates said background image by taking the weight average of the lower layer frames existing timewise before and after said upper layer frame, with respect to an area where a first parts image area corresponding to a partial area of the image in said moving image sequence in the lower layer frame existing timewise before said upper layer frame overlaps on a second parts image area corresponding to a partial area of the image in said moving image sequence in the lower layer frame existing timewise after said upper layer frame, or an area which is neither said first parts image area nor said second parts image area; and
    by using the lower layer frame existing timewise after said upper layer frame, with respect to the area of only said first parts image area, and the lower layer frame existing timewise before said upper layer frame, with respect to the area of only said second parts image area, to thereby generate said background image.

3. A moving image encoding apparatus according to claim 1, wherein, in the case where the parts image area in said lower layer frame which cannot be covered with the parts image in said upper layer frame is larger than a predetermined threshold, said superimposition means generates said background image by performing interpolation, using a pixel value in the circumference thereof, with respect to an area where a first parts image area corresponding to a partial area of the image in said moving image sequence in the lower layer frame existing timewise before said upper layer frame overlaps on a second parts image area corresponding to a partial area of the image in said moving image sequence in the lower layer frame existing timewise after said upper layer frame, and
    by taking the weight average of the lower layer frames existing timewise before and after said upper layer frame, with respect to the area which is neither said first parts image area nor said second parts image area,
    and by using the lower layer frame existing timewise after said upper layer frame, with respect to the area of only said first parts image area, and the lower layer frame existing timewise before said upper layer frame, with respect to the area of only said second parts image area.

4. A moving image encoding apparatus according to one of the claims 1, 2, and 3, comprising:
    comparison means for comparing the position or the size of a shape change of the parts image area in the lower layer frames existing timewise before and after said upper layer frame, wherein
    in the case where the position or the shape change of said parts image area is larger than a predetermined threshold, first and second area information indicating the parts image area in the lower layer frames existing timewise before and after said upper layer frame is output respectively to said superimposition means, and
    in the case where the position or the shape change of said parts image area is smaller than the predetermined threshold, either of said first and second area information indicating the parts image area in the lower layer frame existing timewise before or after said upper layer frame is output to said superimposition means.

5. A moving image encoding apparatus according to one of the claims 1, 2, and 3, wherein, in the case where the parts image area in said lower layer frame which cannot be covered with the parts image in said upper layer frame is smaller than the predetermined threshold, the parts image area in said upper layer frame is expanded so as to include the parts image area in said lower layer frame.

6. A moving image decoding apparatus comprising:

lower layer decoding means for decoding encoded data of the lower layer obtained by encoding the whole image in a moving image sequence at a low frame rate;

upper layer decoding means for decoding encoded data of the upper layer obtained by encoding a partial area of the image in said moving image sequence as a parts image at a high frame rate;

area information decoding means for decoding the encoded data of the area information obtained by encoding the area information indicating a shape of the partial area of the image in said moving image sequence; and superimposition means which, in the case where there is no lower layer frame corresponding timewise to said upper layer frame, generates a lower layer frame corresponding timewise to said upper layer frame as a background image, by using a lower layer frame existing timewise before or after thereof, and superimposes the parts image of said upper layer frame on said background image, said moving image decoding apparatus displaying the image prepared by said superimposition means on a display, wherein, in the case where the parts image area in said lower layer frame which cannot be covered with the parts image in said upper layer frame is larger than a predetermined threshold, said superimposition means generates said background image by synthesizing a frame obtained by taking the weight average of the lower layer frames existing timewise before and after said upper layer frame, and a lower layer frame existing timewise before or after said upper layer frame, and in the case where the parts image area in said lower layer frame which cannot be covered with the parts image in said upper layer frame is smaller than the predetermined threshold, said superimposition means generates said background image by taking the weight average of the lower layer frames existing timewise before and after said upper layer frame.

7. A moving image decoding apparatus according to claim 6, wherein, in the case where the parts image area in said lower layer frame which cannot be covered with the parts image in said upper layer frame is larger than the predetermined threshold, said superimposition means generates said background image by taking the weight average of the lower layer frames existing timewise before and after said upper layer frame, with respect to an area where a first parts image area corresponding to a partial area of the image in said moving image sequence in the lower layer frame existing timewise before said upper layer frame overlaps on a second parts image area corresponding to a partial area of the image in said moving image sequence in the lower layer frame existing timewise after said upper layer frame, or an area which is neither said first parts image area nor said second parts image area; and by using the lower layer frame existing timewise after said upper layer frame, with respect to the area of only said first parts image area, and using the lower layer frame existing timewise before said upper layer frame, with respect to the area of only said second parts image.

8. A moving image decoding apparatus according to claim 6, wherein, in the case where the parts image area in said lower layer frame which cannot be covered with the parts image in said upper layer frame is larger than the predetermined threshold, said superimposition means generates said background image by performing interpolation, using a pixel value in the circumference thereof, with respect to an area where a first parts image area corresponding to a partial area of the image in said moving image sequence in the lower layer frame existing timewise before said upper layer frame overlaps on a second parts image area corresponding to a partial area of the image in said moving image sequence in the lower layer frame existing timewise after said upper layer frame, and by taking the weight average of the lower layer frames existing timewise before and after said upper layer frame with respect to an area which is neither said first parts image area nor said second parts image area; and by using the lower layer frame existing timewise after said upper layer frame, with respect to the area of only said first parts image area, and using the lower layer frame existing timewise before said upper layer frame, with respect to the area of only said second parts image area.

9. A moving image decoding apparatus comprising:

lower layer decoding means for decoding encoded data of the lower layer obtained by encoding the whole image in a moving image sequence at a low frame rate;

upper layer decoding means for decoding encoded data of the upper layer obtained by encoding a partial area of the image in said moving image sequence as a parts image at a high frame rate;

area information decoding means for decoding the encoded data of the area information obtained by encoding the area information indicating a shape of the partial area of the image in said moving image sequence; and superimposition means which, in the case where there is no lower layer frame corresponding timewise to said upper layer frame, generates a lower layer frame corresponding timewise to said upper layer frame as a background image, by using a lower layer frame existing timewise before or after thereof, and superimposes the parts image of said upper layer frame on said background image, said moving image decoding apparatus displaying the image prepared by said superimposition means on a display, wherein, said superimposition means generates said background image by performing interpolation, using a pixel value in the circumference thereof, with respect to the inside of the area where a first parts image area corresponding to a partial area of the image in said moving image sequence in the lower layer frame existing timewise before said upper layer frame overlaps on a second parts image area corresponding to a partial area of the image in said moving image sequence in the lower layer frame existing timewise after said upper layer frame.

10. A moving image decoding apparatus comprising:

lower layer decoding means for decoding encoded data of the lower layer obtained by encoding the whole image in a moving image sequence at a low frame rate;

upper layer decoding means for decoding encoded data of the upper layer obtained by encoding a partial area of the image in said moving image sequence as a parts image at a high frame rate;

area information decoding means for decoding the encoded data of the area information obtained by encoding the area information indicating a shape of the partial area of the image in said moving image sequence; and superimposition means which, in the case where there is no lower layer frame corresponding timewise to said upper layer frame, generates a lower layer frame corresponding timewise to said upper layer frame as a background image, by using a lower layer frame existing timewise before or after thereof, and superimposes the parts image of said upper layer frame on said background image, said moving image decoding apparatus displaying the image prepared by said superimposition means on a display, wherein, in the case where said lower layer frame exists timewise only before the upper layer frame, said superimposition means interpolates the inside of a parts image area corresponding to a partial area of the image in said moving image sequence in the lower layer frame existing timewise before said upper layer frame, using a pixel value in the circumference thereof, to thereby generate said background image.

11. A moving image decoding apparatus comprising:

lower layer decoding means for decoding encoded data of the lower layer obtained by encoding the whole image in a moving image sequence at a low frame rate;

upper layer decoding means for decoding encoded data of the upper layer obtained by encoding a partial area of the image in said moving image sequence as a parts image at a high frame rate;

area information decoding means for decoding the encoded data of the area information obtained by encoding the area information indicating a shape of the partial area of the image in said moving image sequence; and superimposition means which, in the case where there is no lower layer frame corresponding timewise to said upper layer frame, generates a lower layer frame corresponding timewise to said upper layer frame as a background image, by using a lower layer frame existing timewise before or after thereof, and superimposes the parts image of said upper layer frame on said background image, said moving image decoding apparatus displaying the image prepared by said superimposition means on a display, wherein, in the case where said lower layer frame exists timewise only after the upper layer frame, said superimposition means interpolates the inside of a parts image area corresponding to a partial area of the image in said moving image sequence in the lower layer frame existing timewise after said upper layer frame, using a pixel value in the circumference thereof, to thereby generate said background image.

12. A moving image decoding apparatus comprising:

lower layer decoder for decoding encoded data of the lower layer obtained by encoding the whole image in a moving image sequence at a low frame rate;

upper layer decoder for decoding encoded data of the upper layer obtained by encoding a partial area of the image in said moving image sequence as a parts image at a high frame rate;

area information decoder for decoding the encoded data of the area information obtained by encoding the area information indicating a shape of the partial area of the image in said moving image sequence; and superimposition module which, in the case where there is no lower layer frame corresponding timewise to said upper layer frame, generates a lower layer frame corresponding timewise to said upper layer frame as a background image, by using a lower layer frame existing timewise before or after thereof, and superimposes the parts image of said upper layer frame on said background image, wherein said superimposition means interpolates the inside of the parts image area in the lower layer frames existing timewise before and after said upper layer frame, using a pixel value in the circumference of an overlapping area of the parts area of the lower layer, and uses said interpolated lower layer frame to generate said background image.

* * * * *